(12) United States Patent
Palanisamy et al.

(10) Patent No.: US 10,845,815 B2
(45) Date of Patent: Nov. 24, 2020

(54) SYSTEMS, METHODS AND CONTROLLERS FOR AN AUTONOMOUS VEHICLE THAT IMPLEMENT AUTONOMOUS DRIVER AGENTS AND DRIVING POLICY LEARNERS FOR GENERATING AND IMPROVING POLICIES BASED ON COLLECTIVE DRIVING EXPERIENCES OF THE AUTONOMOUS DRIVER AGENTS

(71) Applicant: GM GLOBAL TECHNOLOGY OPERATIONS LLC, Detroit, MI (US)

(72) Inventors: Praveen Palanisamy, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 16/048,144

(22) Filed: Jul. 27, 2018

(65) Prior Publication Data

US 2020/0033868 A1 Jan. 30, 2020

(51) Int. Cl.
*G05D 1/00* (2006.01)
*B60W 50/00* (2006.01)
(Continued)

(52) U.S. Cl.
CPC .......... *G05D 1/0221* (2013.01); *B60W 50/00* (2013.01); *G05D 1/0088* (2013.01); *G06N 3/08* (2013.01);
(Continued)

(58) Field of Classification Search
CPC ......... G06Q 10/06; B60W 50/00; G05D 1/00; G05D 1/0088; G05D 1/0221;
(Continued)

(56) References Cited

U.S. PATENT DOCUMENTS 9,466,161 B2 * 10/2016 Ricci ................... A61B 5/7405
9,815,382 B2 * 11/2017 Penilla ................ B60L 11/1848
(Continued)

OTHER PUBLICATIONS

Ruder, Sebastian. An overview of gradient decent optimization algorithms. Insight centre for Data Analytics. Jun. 15, 2017.
(Continued)

*Primary Examiner* — Yonel Beaulieu
(74) *Attorney, Agent, or Firm* — Lorenz & Kopf LLP

(57) ABSTRACT

Systems and methods are provided autonomous driving policy generation. The system can include a set of autonomous driver agents, and a driving policy generation module that includes a set of driving policy learner modules for generating and improving policies based on the collective experiences collected by the driver agents. The driver agents can collect driving experiences to create a knowledge base. The driving policy learner modules can process the collective driving experiences to extract driving policies. The driver agents can be trained via the driving policy learner modules in a parallel and distributed manner to find novel and efficient driving policies and behaviors faster and more efficiently. Parallel and distributed learning can enable accelerated training of multiple autonomous intelligent driver agents.

18 Claims, 14 Drawing Sheets

(51) Int. Cl.
*B60W 50/08* (2020.01)
*B60W 50/10* (2012.01)
*B60W 60/00* (2020.01)
*G05D 1/02* (2020.01)
*G06N 3/08* (2006.01)

(52) U.S. Cl.
CPC ......... *G05D 1/0231* (2013.01); *G05D 1/0257* (2013.01); *G05D 1/0278* (2013.01); *G05D 2201/0213* (2013.01)

(58) Field of Classification Search
CPC ............... G05D 1/0257; G05D 1/0278; G05D 2201/0213; G06N 3/00; G06N 3/08
See application file for complete search history.

(56) References Cited

U.S. PATENT DOCUMENTS

2014/0309849 A1* 10/2014 Ricci ...................... H04L 67/10
701/33.4
2016/0039426 A1* 2/2016 Ricci .................... A61B 5/7405
701/1
2018/0111494 A1* 4/2018 Penilla .................... H04L 67/12
2019/0050520 A1* 2/2019 Alvarez ................. G06F 30/15

OTHER PUBLICATIONS

Arulkumaran, Kai et al. A Brief Survey of Deep Reinforcement Learning. IEEE Signal Magazine. Sep. 28, 2017.
Sutton, Richard S. and Barto, Andrew G. Reinforcement Learning: An Introduction second edition. Adaptive Computation & Machine Learning Series. The MIT Press. Jul. 8, 2018.
Szepesvari, Csaba. Algorithms for Reinforcement Learning. Draft of the lecture published in the Synthesis Lectures on Artificial Intelligence & Machine Learning series by Morgon & Claypool Publishers. Jun. 9, 2009.

* cited by examiner

SYSTEMS, METHODS AND CONTROLLERS
FOR AN AUTONOMOUS VEHICLE THAT
IMPLEMENT AUTONOMOUS DRIVER
AGENTS AND DRIVING POLICY LEARNERS
FOR GENERATING AND IMPROVING
POLICIES BASED ON COLLECTIVE
DRIVING EXPERIENCES OF THE
AUTONOMOUS DRIVER AGENTS

INTRODUCTION

The present disclosure generally relates to autonomous vehicles, and more particularly relates to autonomous vehicle controllers, autonomous vehicle control system systems and associated methods for controlling autonomous vehicles. The systems, methods and controllers for an autonomous vehicle implement autonomous driver agents that collect driving experiences and driving policy learners that generate and improve policies that are served to and used by the autonomous driver agents to control an autonomous vehicle.

An autonomous vehicle is a vehicle that is capable of sensing its environment and navigating with little or no user input. An autonomous vehicle includes an autonomous driving system (ADS) that intelligently controls the autonomous vehicle. A sensor system senses its environment using sensing devices such as radar, lidar, image sensors, and the like. The ADS can also process information from global positioning systems (GPS) technologies, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Currently, there are many different approaches for autonomous vehicle control, but all suffer from drawbacks.

Many autonomous vehicles being proposed today that are capable of providing higher automation levels require external supervision and/or labelled data. Moreover, many autonomous vehicle systems are not scalable without supervision or external labeled data. For example, deep learning systems for autonomous vehicle systems are not scalable because they rely on labeled data which are prohibitively time-consuming and labor-intensive to create. Training and validation of neural networks used to implement such autonomous vehicles to achieve automotive reliability in all environments or use cases is a daunt engineering task.

Accordingly, it is desirable to provide systems and methods for autonomous vehicle control that are reliable, easy to train and validate, etc. Furthermore, other desirable features and characteristics of the present disclosure will become apparent from the subsequent detailed description and the appended claims, taken in conjunction with the accompanying drawings and the foregoing technical field and background.

SUMMARY

System, methods and controller are provided for controlling an autonomous vehicle. In one embodiment, a method is provided comprising: capturing, via one or more driver agents and one or more corresponding one or more driving environment processors, driving experiences during different driving scenarios in different driving environments, wherein each driving experience comprises data that represents a particular driving environment at a particular time; retrieving, via one or more driving policy learner modules of a driving policy generation module, at least some of the driving experiences; processing, at one or more driving policy learner modules, at least some of the driving experiences to learn and generate parameters that describe one or more policies, wherein each policy prescribes a distribution over a space of actions for any given state, and wherein each policy comprises a set of parameters that describe the policy and are processible by at least one of the driver agents to generate an action for controlling a vehicle; processing, at the one or more driver agents, received parameters for at least one candidate policy, and executing the at least one candidate policy to generate one or more actions that control the vehicle in a specific driving environment as observed by a corresponding driving environment processor; and processing, at a low-level controller, each action to generate control signals for controlling the vehicle when operating in that specific driving environment.

In one embodiment, the data for each driving experience (that represents a particular driving environment at a particular time) comprises: a state of the particular driving environment observed by a corresponding driving environment processor; an observation made using at least part of an observable state; an action generated by the driver agent; a reward comprising: a signal that signifies how desirable an action performed by the driver agent is at a given time under particular environment conditions, wherein the reward is automatically computed based on road rules and driving principles extracted from human driving data or defined using other appropriate methods based on traffic and the road rules; a goal to be achieved by the driver agent; instance information comprising: information that indicates impact or priority of the driving experience as determined by that driver agent at the time that particular driving experience was acquired; and other meta information about that particular driving experience; and a next state of the particular driving environment that results after the driver agent performs the action in the driving environment; and a next observation made using at least part of an observable next state.

In one embodiment, each of the driving environment processors can process sensor information from on-board sensors that describes a specific driving environment to generate a state of the specific driving environment, and each of the one or more driver agents can then process the state in accordance with a policy to generate a corresponding action. The low-level controller can then translate each action to generate the control signals for controlling the vehicle to autonomously control the vehicle when operating in that state in that specific driving environment.

In one embodiment, each of the driving policy learner modules comprises a Deep Reinforcement Learning (DRL) algorithm that can process input information from at least some of the driving experiences to learn and generate an output comprising: a set of parameters representing a policy that are developed through DRL, and wherein each policy is processible by at least one of the driver agents to generate an action for controlling the vehicle.

In one embodiment, each DRL algorithm comprises one or more of: estimated values of state/action/advantage as determined by a state/action/advantage value function; and a policy distribution, and each DRL algorithm comprises: a policy-gradient-based reinforcement learning algorithm; or a value-based reinforcement learning algorithm; or an actor-critic based reinforcement learning algorithm.

In one embodiment, each of the driving policy learner modules further comprises a learning target module, wherein each learning target module is configured to process trajectory steps of a driver agent within a driving environment to compute desired learning targets that are desired to be achieved. Each trajectory step comprises: a state, an observation, an action, a reward, a next-state and a next-observation, and each learning target represents a result of an action that is desired for a given driving experience. In one embodiment, each of the learning targets comprises at least one of: a value target that comprises: an estimated value of a state/action/advantage to be achieved; and a policy objective to be achieved.

In one embodiment, each DRL algorithm is configured to process data relating to driving experiences using stochastic gradient updates to train a neutral network comprising more than one layer of hidden units between its inputs and outputs Each of the driving policy learner modules further comprises: a loss module comprising: a loss function configured to process the learning targets output by the corresponding learning target module and the output of the corresponding DRL algorithm to compute an overall output loss; and a automatic differentiation module configured to process the overall output loss to generate gradient data for each parameter. The automatic differentiation module configured to process each instance of loss data (from the overall output loss) by performing automatic differentiation by differentiating the overall output loss computed by the loss function with respect to each of the parameters (e.g., using computation graph and a chain rule) to obtain gradient data for each parameter with respect to overall output loss. The gradient data for each parameter indicates the contribution of each parameter with respect to the overall output loss computed by the loss function. The gradient data represents gradients of each neuron in each neural network used by each DRL algorithm, wherein the gradients quantitatively define how much of a contribution each neuron made which resulted in the loss due to output of that neural network. Each of the driving policy learner modules further comprises a gradient descent optimizer configured to process the gradient data for each parameter to compute updated parameters (e.g., updates for each parameter) representing a policy. The updated parameters collectively compensate for the overall output loss. The updated parameters are available to be used by the driver agents, and can be used by the driving learner modules to retrain and optimize neural network parameters of the DRL algorithm.

In one embodiment, each policy specifies a set of parameters that when executed by a particular driver agent define behaviors to be enacted by the vehicle by controlling actuators of the vehicle to operate in response to a given set of sensor inputs.

In another embodiment, a system is provided that comprises a driver agent module, a driving policy generation module, and a low-level controller. The driver agent module includes one or more driving environment processors each being configured to: observe a driving environment; and one or more driver agents each corresponding to one of the driving environment processors. Each of the one or more driver agents is configured to: execute a policy that controls a vehicle in a specific driving environment as observed by a corresponding driving environment processor for that driver agent module; and capture driving experiences during different driving scenarios in different driving environments. Each driving experience comprises data that represents a particular driving environment at a particular time. The driving policy generation module comprising: one or more driving policy learner modules each being configured to: retrieve at least some of the driving experiences process at least some of the driving experiences to learn and generate parameters that describe one or more policies. Each policy prescribes a distribution over a space of actions for any given state, and comprises a set of parameters that describe the policy and are processible by at least one of the driver agents to generate an action for controlling the vehicle. The low-level controller is configured to process each action to generate control signals for controlling the vehicle when operating in that specific driving environment.

In one embodiment, each of the driving environment processors is configured to process sensor information from on-board sensors that describes a specific driving environment to generate a state of the specific driving environment, and wherein each of the one or more driver agents is further configured to: process the state, in accordance with a policy, to generate a corresponding action. Each policy prescribes a distribution over a space of actions for any given state. The low-level controller is configured to translate each action to generate the control signals for controlling the vehicle to autonomously control the vehicle when operating in that state in that specific driving environment.

In one embodiment, each of the driving policy learner modules comprises: a Deep Reinforcement Learning (DRL) algorithm that is configured to: process input information from at least some of the driving experiences to learn and generate an output comprising: a set of parameters representing a policy that are developed through DRL. Each policy is processible by at least one of the driver agents to generate an action for controlling the vehicle. Each DRL algorithm comprises: a policy-gradient-based reinforcement learning algorithm; or a value-based reinforcement learning algorithm or an actor-critic based reinforcement learning algorithm. The output of the DRL algorithm comprises one or more of: (1) estimated values of state/action/advantage as determined by a state/action/advantage value function; and (2) a policy distribution.

In one embodiment, each of the driving policy learner modules further comprises: a learning target module configured to process trajectory steps of a driver agent within a driving environment to compute desired learning targets that are desired to be achieved, wherein each trajectory step comprises: a state, an observation, an action, a reward, a next-state and a next-observation, and wherein each learning target represents a result of an action that is desired for a given driving experience. In one embodiment, each of the learning targets comprises at least one of: a value target that comprises: an estimated value of a state/action/advantage to be achieved; and a policy objective to be achieved.

In one embodiment, each DRL algorithm is configured to process data relating to driving experiences using stochastic gradient updates to train a neutral network comprising more than one layer of hidden units between its inputs and outputs. Each of the driving policy learner modules further comprises: Each of the driving policy learner modules further comprises: a loss module comprising: a loss function configured to process the learning targets output by the corresponding learning target module and the output of the corresponding DRL algorithm to compute an overall output loss; and a automatic differentiation module configured to process the overall output loss to generate gradient data for each parameter. The automatic differentiation module configured to process each instance of loss data (from the overall output loss) by performing automatic differentiation by differentiating the overall output loss computed by the loss function with respect to each of the parameters (e.g., using computation graph and a chain rule) to obtain gradient data for each parameter with respect to overall output loss. The gradient data for each parameter indicates the contribution of each parameter with respect to the overall output loss computed by the loss function. The gradient data represents gradients of each neuron in each neural network used by each DRL algorithm, wherein the gradients quantitatively define how much of a contribution each neuron made which resulted in the loss due to output of that neural network. Each of the driving policy learner modules further comprises a gradient descent optimizer configured to process the gradient data for each parameter to compute updated parameters (e.g., updates for each parameter) representing a policy. The updated parameters collectively compensate for the overall output loss. The updated parameters are available to be used by the driver agents, and can be used by the driving learner modules to retrain and optimize neural network parameters of the DRL algorithm.

In another embodiment, a system (e.g., a controller for an autonomous vehicle) is provided comprising: non-transitory memory comprising instructions; and one or more processors in communication with the memory. The one or more processors execute the instructions to: capture, via one or more driver agents and one or more corresponding one or more driving environment processors, driving experiences during different driving scenarios in different driving environments, wherein each driving experience comprises data that represents a particular driving environment at a particular time; retrieve, via one or more driving policy learner modules of a driving policy generation module, at least some of the driving experiences; process, at one or more driving policy learner modules, at least some of the driving experiences to learn and generate parameters that describe one or more policies, wherein each policy prescribes a distribution over a space of actions for any given state, and wherein each policy comprises a set of parameters that describe the policy and are processible by at least one of the driver agents to generate an action for controlling a vehicle; process, at the one or more driver agents, received parameters for at least one candidate policy, and execute the at least one candidate policy to generate one or more actions that control the vehicle in a specific driving environment as observed by a corresponding driving environment processor; and process, at a low-level controller, each action to generate control signals for controlling the vehicle when operating in that specific driving environment.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
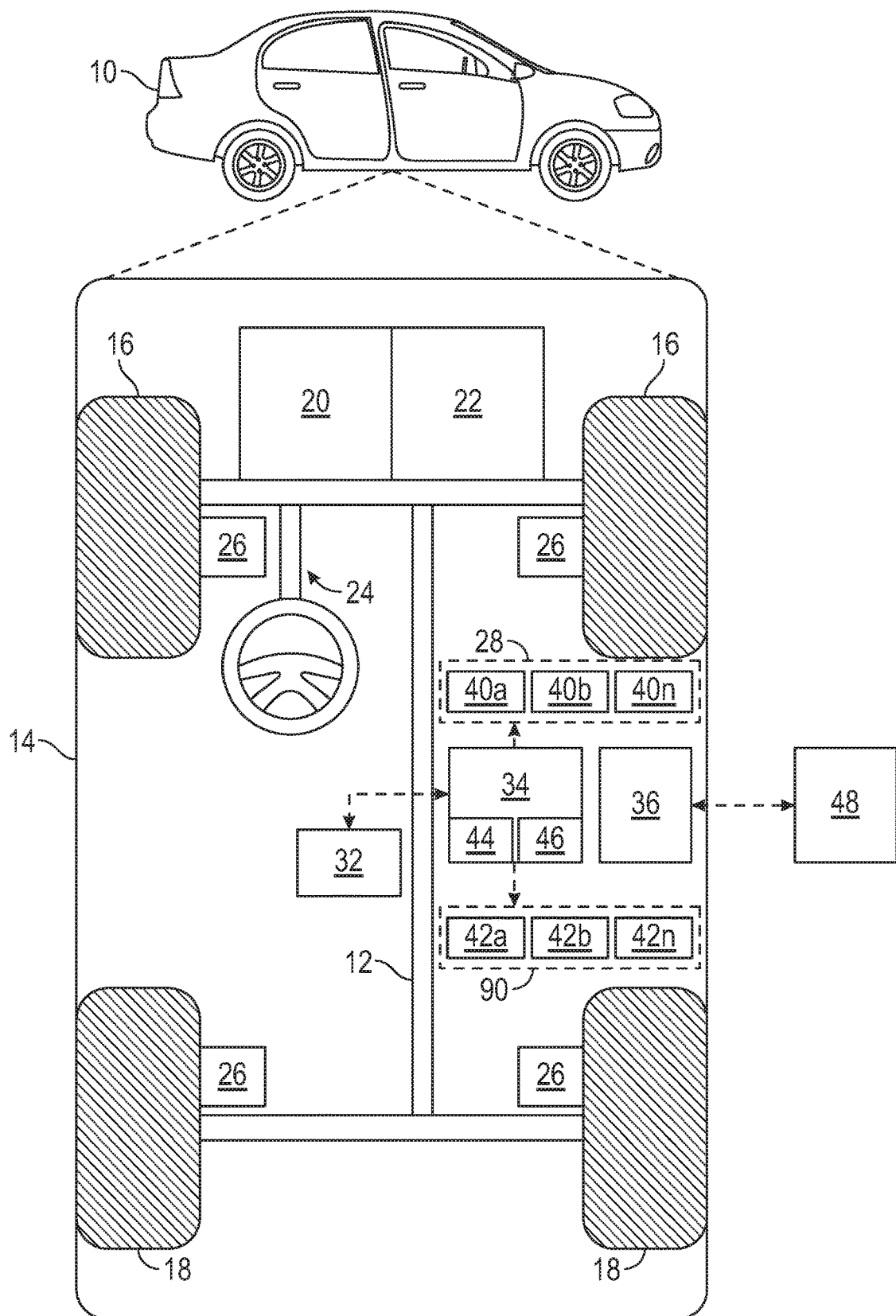
FIG. 1 is a functional block diagram illustrating an autonomous vehicle in accordance with the disclosed embodiments.

FIG. 1 is a functional block diagram illustrating an autonomous vehicle in accordance with the disclosed embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and an autonomous driving system (ADS) is incorporated into the autonomous vehicle 10 (hereinafter referred to as the autonomous vehicle 10) that intelligently controls the vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 can be, for example, a Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, at least one data storage device 32, at least one controller 34, a communication system 36, and an actuator system 90. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 that is configured to provide sensor data 29. The sensor system 28 can include one or more sensing devices 40a-40n that sense observable conditions of the exterior environment and/or the interior environment of the autonomous vehicle 10. The sensing devices 40a-40n can include, but are not limited to, radars, lidars, optical cameras, thermal cameras, imager sensors, ultrasonic sensors, inertial measurement units, global positioning systems, navigation systems, and/or other sensors.

For example, radar devices can process electromagnetic waves reflected from objects to generate radar data that indicates the presence, direction, distance, and speed of objects within the field of view. A radar filtering and preprocessing module can pre-process the radar data to remove things like stationary objects, objects in undriveable areas (like radar returns from buildings) and noisy measurements/interference (e.g., due to velocity) to generate pre-processed radar data. Radar tracking can then further process the preprocessed radar data to generate the radar tracking information, which can then be used to track objects.

Cameras (or image sensors) can be spaced to provide three-hundred and sixty (360) degree image coverage of the environment surrounding the vehicle 10. The cameras capture images (e.g., image frames) and output image data (e.g., a distorted, YUV format image), which can then be processed to generate rectified (or undistorted) camera images. An image preprocessing module can process the image data by undistorting/rectifying it, preprocessing the rectified image data (e.g., image resizing and mean subtraction), and converting the rectified, pre-processed image data into rectified camera images (e.g., having a normal RGB format) that a neural network of an image classification module can classify. The image data can be rectified to correct distortions in the image can cause lines that are straight (in reality) to appear curved, for example, if point clouds in 3D space were projected onto the unrectified image data, they might actually be in the wrong place in the image because of the distortions. By rectifying the image, the projections from 3D space correspond to the correct parts of the image. The rectified camera images can then be sent to an image classification module along with other inputs including three-dimensional locations of objects from an object tracking module, and processed to generate the image classification data that can be provided to an object classification module and used to generate object classification data, which can then be sent to an object tracking module that processes the objects, the radar tracking information, and object classification data to generate object tracking information.

Lidar devices perform a scan by illuminating a target with pulses of laser light, and measure distance to a target by receiving reflected pulses back. The intensity of the reflected pulses can be collectively used by the lidar devices to generate a lidar point cloud that represents the spatial structure/characteristics of objects within the field of view. For instance, the lidar devices can use rotating laser beams that rotate to scan three-hundred and sixty (360) degrees around the vehicle. Alternatively, the lidar devices can oscillate back and forth at a certain scan frequency (i.e., how fast they oscillate) and emit pulses at a repetition rate.

Each of the lidar devices receive lidar data and process the lidar data (e.g., packets of lidar return information) to generate a lidar point cloud (e.g., a three-dimensional set of points in a three-hundred and sixty (360) degree zone around the vehicle). Each point has intensity data in addition to a three-dimensional XYZ location. For example, in one implementation, the point cloud includes a first, intermediate and last returned from each laser pulse. The lidar devices can be synchronized together (or phase locked).

Cameras can be run at their maximum frame rate, and the refresh rate of the cameras is usually much higher than the lidar devices. As lidar spins clockwise from the back of the vehicle, each camera captures images in a clockwise order during the lidar device's rotation. An extrinsic calibration procedure can provide information regarding where the cameras are pointing. The lidar devices are phase locked (i.e., scheduled to be in certain rotational positions at certain times) so it is known when the lidar devices scan certain parts of their cycle. For analysis of a scene, the system can determine which imager/camera is aligned at a point in time when certain lidar data was acquired. The system can then select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

Lidar data of the lidar point clouds acquired by the lidar devices can be fused into a single lidar point cloud. Three-dimensional point sampling can then be performed to pre-process the lidar data (of the single lidar point cloud) to generate a set of three-dimensional points, which can then be segmented by an object segmentation module into objects that can be classified and tracked. For instance, an object classification module can include multiple classifiers that classify the objects to generate object classification data. An object tracking module can track the objects. Tracking information can then be used along with the radar tracking information and the object classification data to generate object tracking information (e.g., temporal tracking information for objects such as location, geometry, speed, etc. of objects in the environment).

Control signals 72 (e.g., steering torque or angle signals used to generate corresponding steering torque or angle commands, and brake/throttle control signals used to generate acceleration commands) are sent to the actuator system 90, which processes the control signals 72 to generate the appropriate commands to control various vehicle systems and subsystems. In one embodiment, the actuator system 90 includes a low-level controller and a plurality of actuators of the vehicle (e.g., a steering torque or angle controller, a brake system, a throttle system, etc.). The low-level controller processes the control signals 72 to generate commands that control the actuators in accordance with the control signals 72 to schedule and execute one or more control actions to be performed to automate driving tasks. The control signals 72 specify or map to control actions and parameters that are used to schedule the one or more scheduled actions to be performed to automate driving tasks. The one or more control actions automatically control the autonomous vehicle to automate an autonomous driving task encountered in a particular driving scenario and achieve a particular vehicle trajectory and speed profile.

In this example, the actuator system 90 includes one or more actuator devices 42a-42n that control one or more vehicle features such as, but not limited to, the propulsion system 20, the transmission system 22, a throttle system (not illustrated), the steering system 24, and the brake system 26. The actuator system 90 receives control signals 72 generated by the high-level controller 33, and a low-level controller processes control signals to generate commands that control one or more of these actuator devices 42a-42n in accordance with the control signals 72 to schedule and execute one or more control actions to be performed to automatically control the autonomous vehicle and automate the autonomous driving task encountered in a particular driving scenario (e.g., to achieve one or more particular vehicle trajectory and speed profiles). A particular driving scenario or scene that is encountered (as represented, for example, by the navigation route data, GPS data, and a world representation generated based on information from technologies such as cameras, radars, lidars, etc.) can be addressed by decomposing that particular driving scenario into a sequence control actions. Each control action that control the vehicle's trajectory and speed to accomplish a particular sub-task. Collectively the sequence control actions control the vehicle to achieve a desired path over a period of time. Each vehicle trajectory and speed profile can define a path that the vehicle can potentially travel over if followed. Each vehicle trajectory and speed profile includes information that specifies longitudinal distance (x), lateral distance (y), heading (θ), and desired velocity (v) of the vehicle that will travel through in future time instants. In addition, in some embodiments, the vehicle features can further include interior and/or exterior vehicle features such as, but are not limited to, doors, a trunk, and cabin features such as air, music, lighting, etc. (not numbered).

Figure 2:
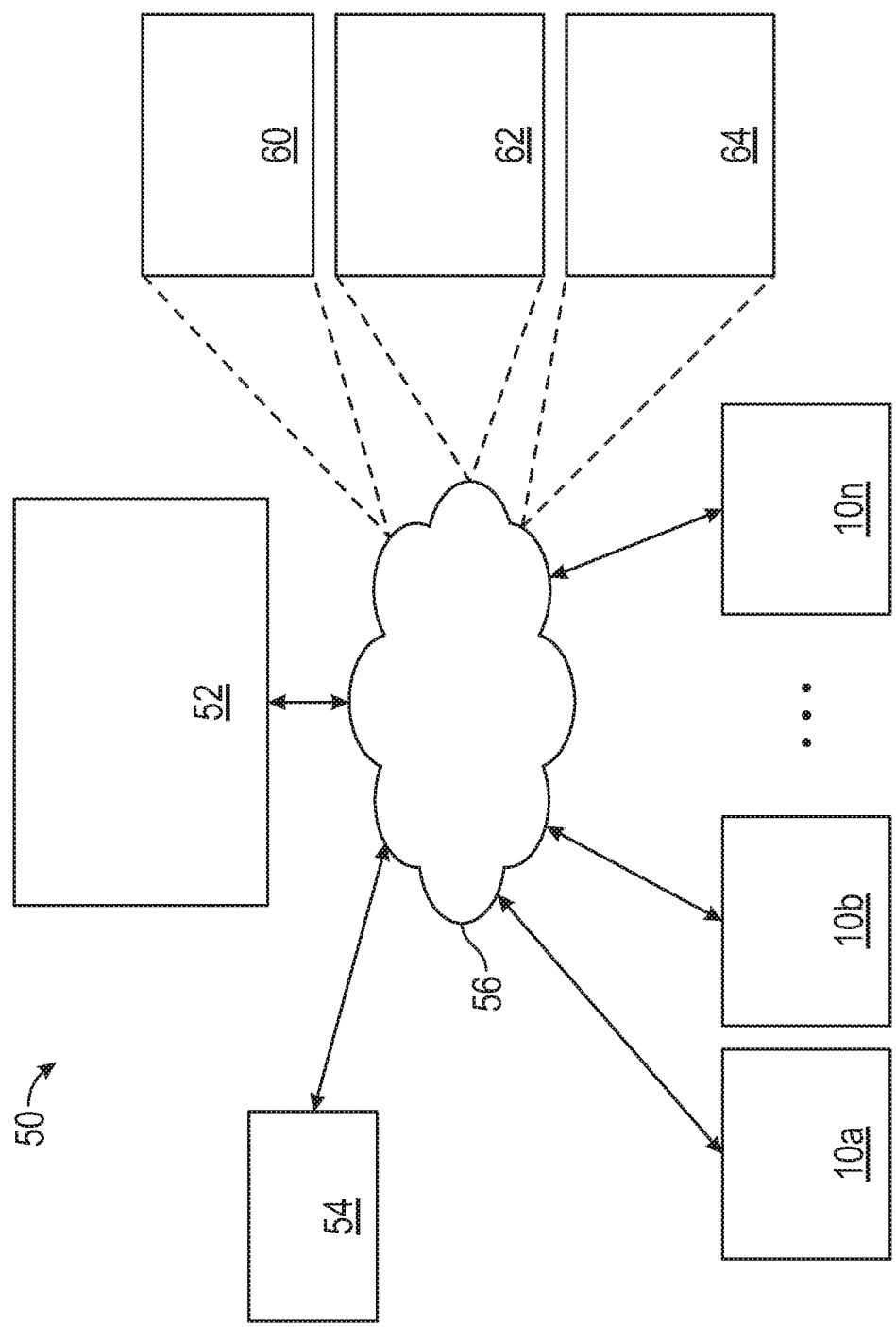
FIG. 2 is a functional block diagram illustrating a transportation system having one or more autonomous vehicles of FIG. 1 in accordance with the disclosed embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 90 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more actuator devices 42a-42n that control one or more vehicle features of the autonomous vehicle 10.

In various embodiments, one or more instructions of the controller 34 are embodied in a high-level controller of an autonomous driving system (ADS) and, when executed by the processor 44, to generate the control signals that are processed by a low-level controller to generate commands that control one or more of actuators of the autonomous vehicle to execute one or more control actions to automatically control the autonomous vehicle (e.g., to automate the autonomous driving task encountered in the particular driving scenario).

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
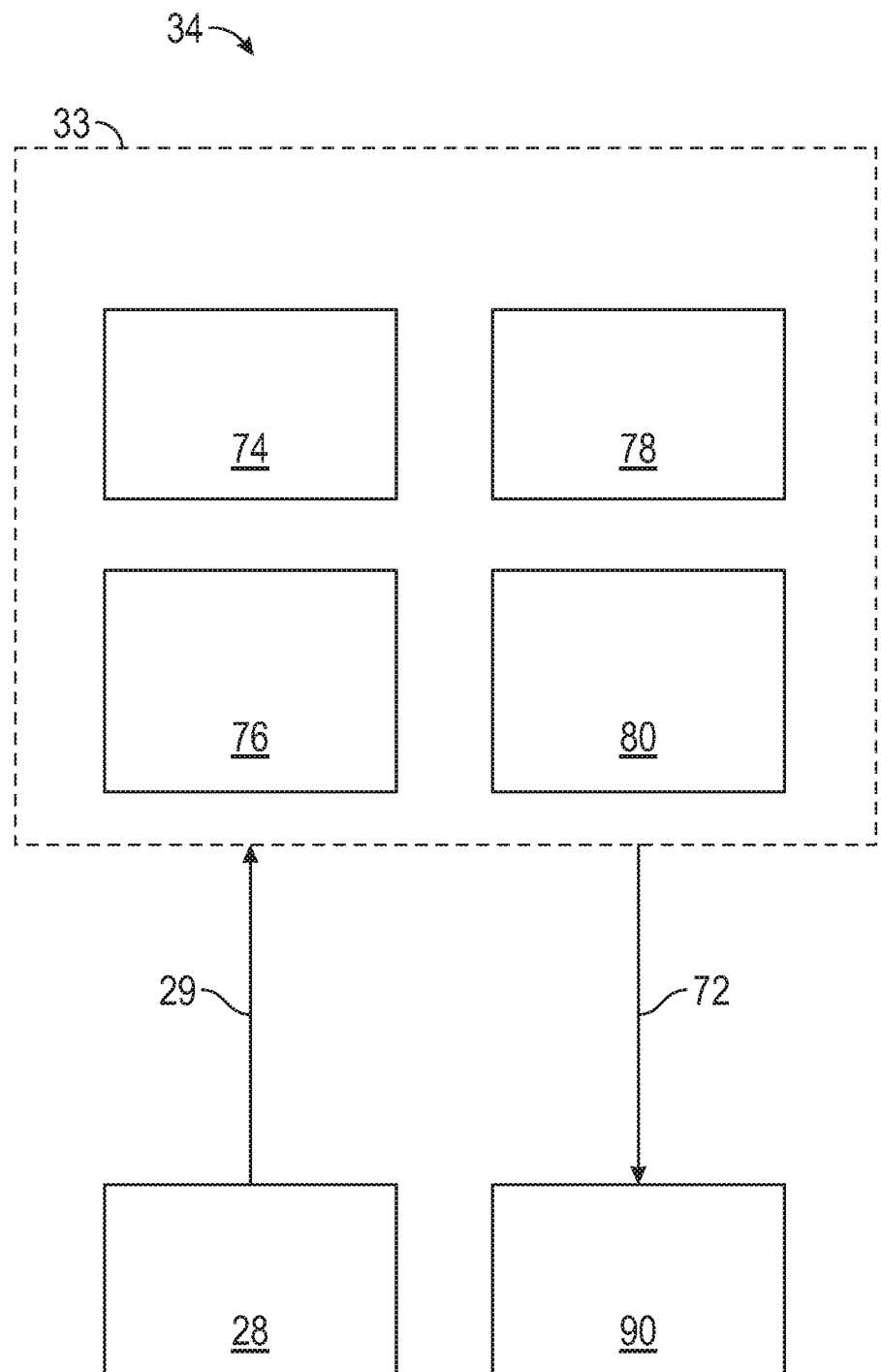
FIG. 3 is a dataflow diagram illustrating an autonomous driving system of the autonomous vehicle in accordance with the disclosed embodiments.

In accordance with various embodiments, the controller 34 implements a high-level controller of an autonomous driving system (ADS) 33 as shown in FIG. 3. That is, suitable software and/or hardware components of the controller 34 (e.g., the processor 44 and the computer-readable storage device 46) are utilized to provide a high-level controller of an autonomous driving system 33 that is used in conjunction with vehicle 10.

In various embodiments, the instructions for the high-level controller of the autonomous driving system 33 may be organized by function, module, or system. For example, as shown in FIG. 3, the high-level controller of the autonomous driving system 33 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals 72 for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Overview

In one embodiment, an autonomous driving policy generation and server system is provided. The system can include a set of autonomous driver agents, an experience memory that stores experiences captured by the driver agents, a driving policy generation module that includes a set of driving policy learner modules for generating and improving policies based on the collective experiences stored in the experience memory, and a policy server that serves parameters for policies to the driver agents. The driver agents can collect driving experiences to create a knowledge base that is stored in an experience memory. The driving policy learner modules can process the collective driving experiences to extract driving policies (or rules) and/or bootstrap new learning paradigms. The driver agents can be trained via the driving policy learner modules in a parallel and distributed manner without having to rely on labelled data or external supervision. The parallel and distributed architecture of the autonomous driving policy generation and server system allows the driver agents and driving policy learner modules to find novel driving policies and behaviors faster and more efficiently. Because the driving policy learner modules do not need to rely on labeled data or supervision, which can be prohibitively time-consuming and labor-intensive to create, the scalability of the system can be improved. Parallel and distributed learning can enable accelerated training of multiple autonomous intelligent driver agents, and allow for faster development, testing, and large-scale AV behavior validation cycles (e.g., city or country wide validation). Policies that are learned by the driving policy learner modules are transferable to other driving tasks and/or domains.

Figure 4A:
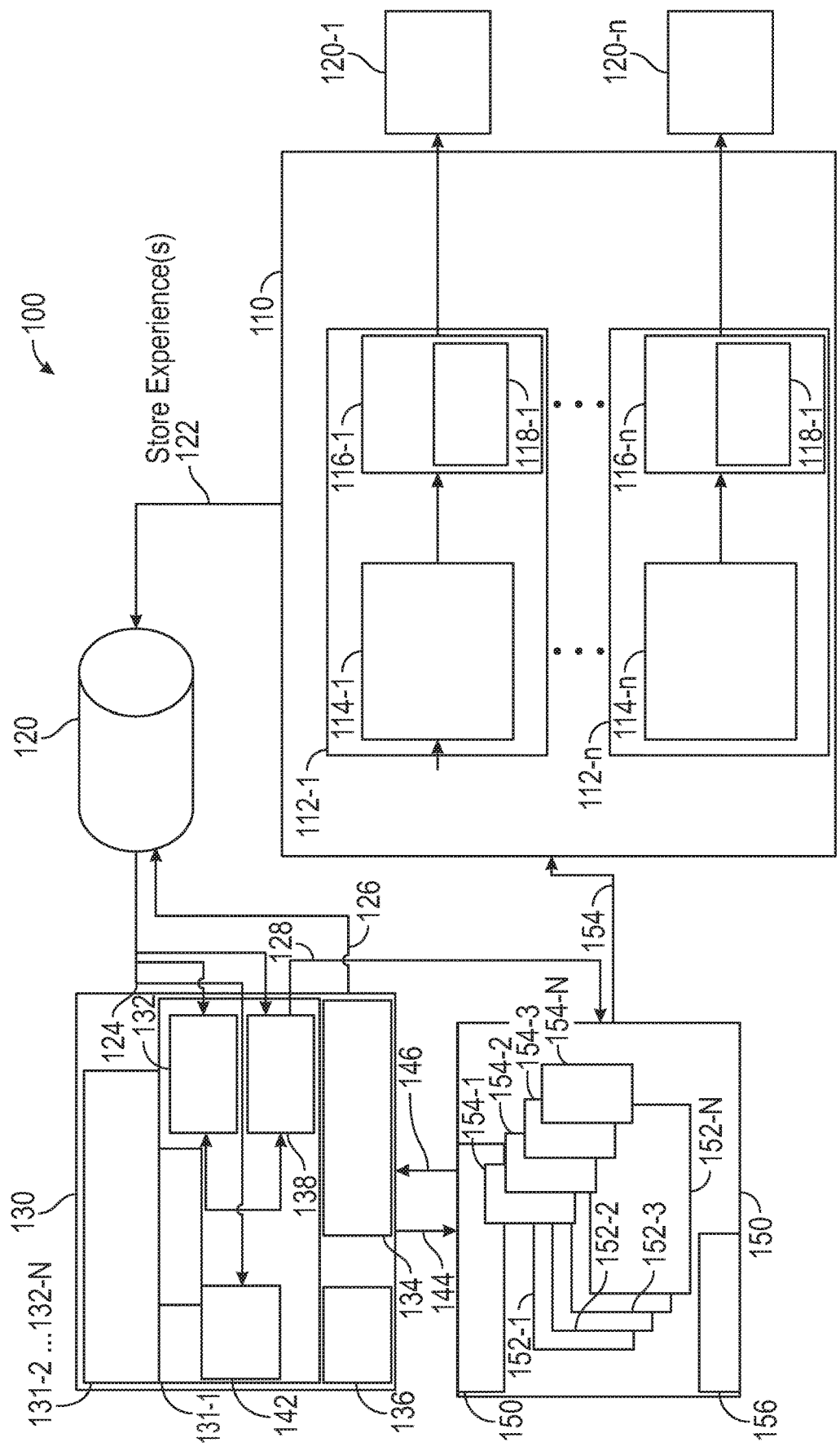
FIG. 4A is a block diagram that illustrates an autonomous driving policy generation and server system for autonomous driver agents in accordance with the disclosed embodiments.

FIG. 4A is a block diagram that illustrates an autonomous driving policy generation and server system 100 for autonomous driver agents 116-1 . . . 116-n in accordance with the disclosed embodiments. In general, the autonomous driving policy generation and server system 100 includes a set or plurality of autonomous driver agents 116-1 . . . 116-n, an experience memory 120, a driving policy generation module 130 and a policy server 150. In one embodiment, the AI driver agent system 110 includes a set of driving environment processors 114-1 . . . 114-n and a corresponding set of n driver agents 116-1 . . . 116-n, where n is greater than or equal to 1. The driving policy generation module 130 includes a set of k driving policy learner modules 131-1 . . . 131-k, where k is greater than or equal to 1.

Figure 4B:
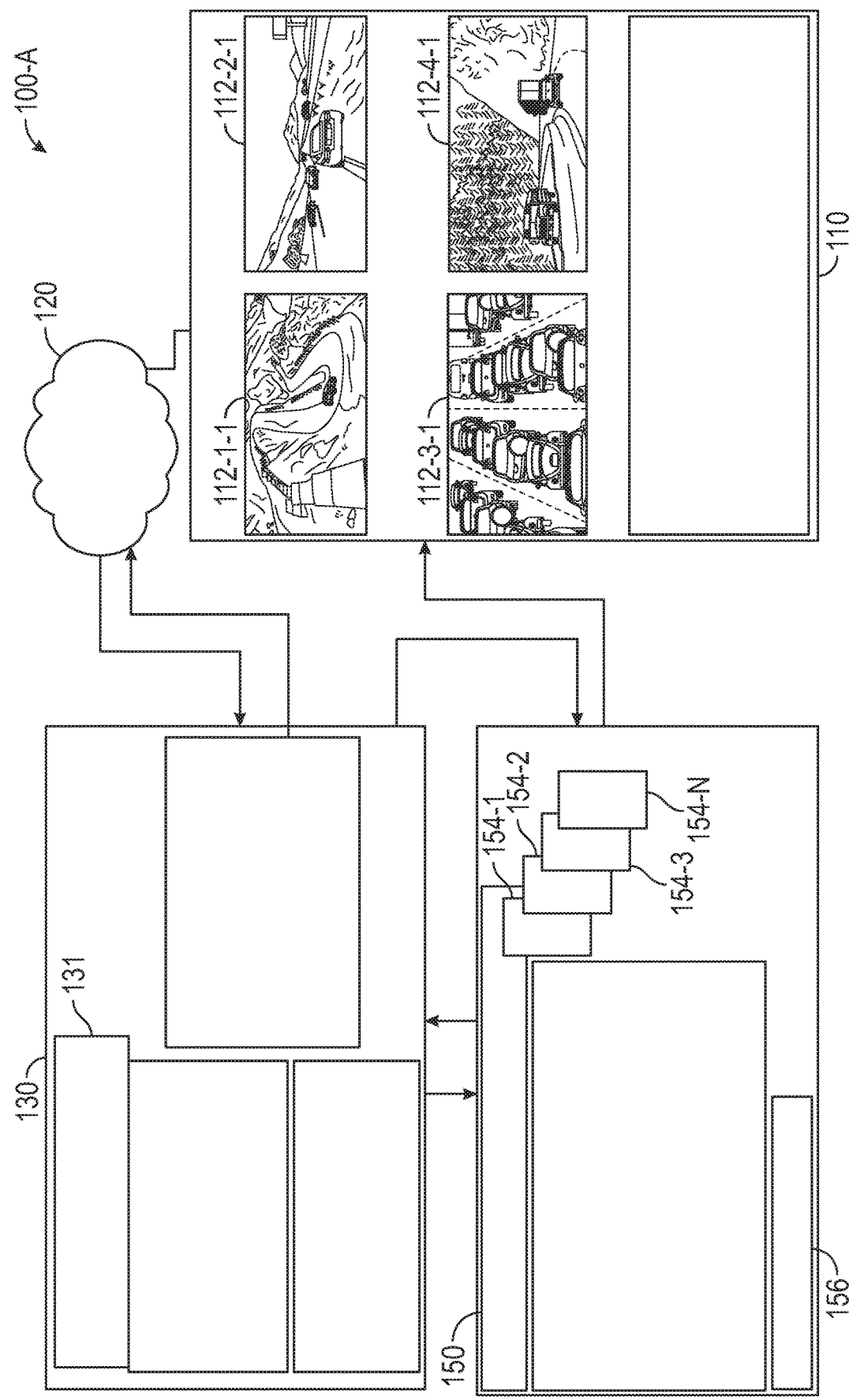
FIG. 4B is a block diagram that illustrates a distributed autonomous driving policy generation and server system in accordance with the disclosed embodiments.
Figure 4C:
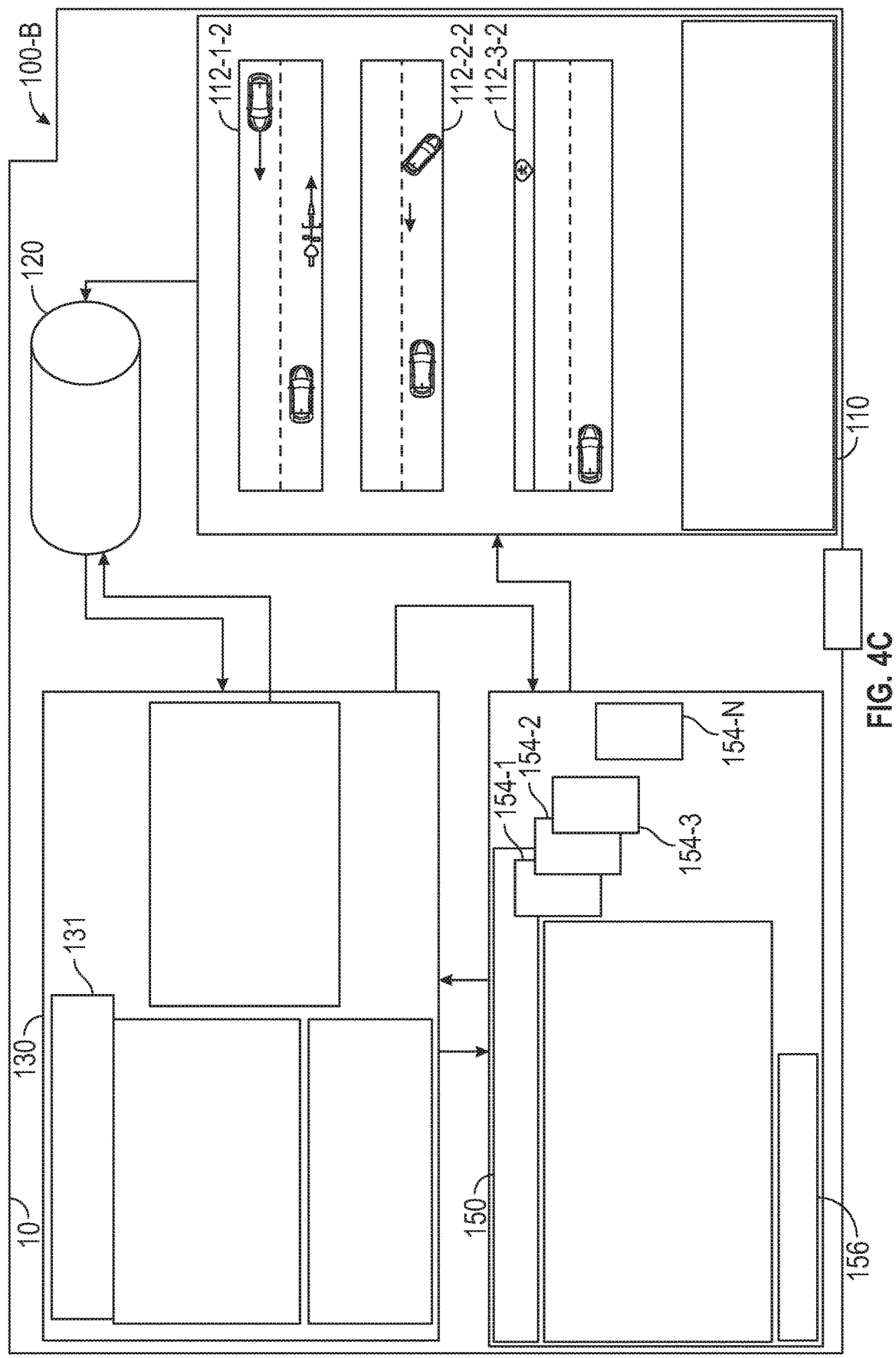
FIG. 4C is a block diagram that illustrates a consolidated autonomous driving policy generation and server system in accordance with the disclosed embodiments.

Depending on the implementation, the autonomous driving policy generation and server system 100 can be implemented in a distributed architecture 100-A as shown in FIG. 4B, or entirely within an AV as shown in FIG. 4C. As will be explained below with reference to FIGS. 4B and 4C, the set of driving environment processors 114 and the corresponding set of autonomous driver agents 116-1 . . . 116-n is always implemented within an AV (or possibly within an AV simulator), while the experience memory 120, the driving policy generation module 130, and the policy server 150 could be implemented within a vehicle, or within a computing cloud/server system depending on the embodiment.

FIG. 4B is a block diagram that illustrates a distributed autonomous driving policy generation and server system 100-A in accordance with the disclosed embodiments. In the non-limiting embodiment illustrated in FIG. 4B, the driver agents are implemented at different AVs 10, whereas the experience memory 120, the driving policy generation module 130 and the policy server 150 can be implemented within a computing cloud or similar server system. In this embodiment the components of the autonomous driving policy generation and server system 100-A are distributed, meaning that driver agents 116-1 . . . 116-n can be implemented at a number of different AVs, while the others (e.g., experience memory 120, the driving policy generation module 130 and the policy server 150) are implemented at remote servers or in a could computing platform (e.g., High-Performance Computing Cluster). In addition, there are also differences in how the set of driving environment processors 114 and the corresponding set of autonomous driver agents 116 and the experience memory 120 operate in the embodiment illustrated in FIG. 4B when compared to the embodiment illustrated in FIG. 4C. For example, in FIG. 4B, many different driving environment processors 114 and corresponding autonomous driver agents 116 from many AVs gather experiences and send them to a centrally accessible cloud-based experience memory. In this embodiment, each of the driving environment processors 114 and the corresponding autonomous driver agents 116-1 . . . 116-n can be deployed in different AVs driving in different environments 114. In addition, driving experiences gathered by each of the driver agents 116-1 . . . 116-n can be sent to a centrally accessible memory (e.g., implemented within a computing cloud) that is accessible by many AVs, and which is referred to herein as a shared experience memory 120-A.

FIG. 4C is a block diagram that illustrates a consolidated autonomous driving policy generation and server system 100-B in accordance with the disclosed embodiments. In the non-limiting embodiment illustrated in FIG. 4C, the driving environment processors 114 and the corresponding autonomous driver agents 116-1 . . . 116-n, the experience memory 120, the driving policy generation module 130 and the policy server 150 can all be implemented or embodied within a single vehicle 10 such that all the processes run at that vehicle 10. The various components of the consolidated autonomous driving policy generation and server system 100-B function similar to those in FIG. 4B but with some differences. In this embodiment, one or more autonomous driver agents 116 implemented at a single AV gathers experiences from different trips by that AV and sends them to an onboard or local experience memory within the AV. To explain further, each of the driving environment processors 114 and the corresponding autonomous driver agents 116-1 . . . 116-n can be deployed in a particular autonomous vehicle 10. Each of the driver agents 116-1 . . . 116-n can gather different driving experiences from different trips by that autonomous vehicle 10. Driving experiences gathered by each of the driver agents 116-1 . . . 116-n can be pooled and stored at a local memory store (e.g., on-board the AV) that is referred to herein as an experience memory store 120.

The various elements of FIGS. 4A through 4C will now be described in greater detail below with continued reference to FIG. 4A and with reference to FIGS. 5-11.

Driving Environment Processors and Autonomous Driver Agents

Each driving environment processor 114-1 to 114-n can process sensor information that describes a particular driving environment. The sensor information can be acquired using the vehicle's on-board sensors including but not limited to cameras, radars, lidars, V2X communication and other sensors described herein. Driver agents 116-1 . . . 116-n are artificial intelligence based autonomous driver agents. Each of the driver agents 116-1 . . . 116-n can gather different driving experiences from different driving environments observed by the driving environment processors 114-1 to 114-n. In one embodiment, each driving experience can be represented in a large, multi-dimensional tensor that includes information from a particular driving environment at a particular time. Each experience includes: state (S), observation (O), action (A), reward (R), next state (S^'), next observation (O^'), goal (G), and instance information (I). As used herein, the term "state (S)," when used with reference to a driving experience, can refer to the state of the environment that can be perceived/observed by the driving environment processor and driver agents through sensors on-board the vehicle or through some other means like Vehicle to Infrastructure (V2I) or Vehicle to Vehicle (V2V) communication or from the simulation engine in case of simulated driving environments. As used herein, the term "observation (O)," when used with reference to a driving experience, can refer to the whole or partial information that is contained in the state (S). In some cases, the driving environment may not be fully observable by the driver agent/environment-processor. For example, everything that is going on in the driving environment may not be observable. For instance, the intention of the other vehicles or pedestrians, etc. might not be known. The driving environment processor on the vehicle receives the information about the environment acquired using the variety of sensors on the vehicle as well as from other infrastructure-based information about the environment (e.g., from satellites/V2X etc), processes it and provides it as the "observation" input to the driver agent process. In the cases when the driving environments (e.g., in simulated driving environments) is fully observable, or assuming that they are fully observable improves the performance of the driving agents, the information about the environment can be provided as the "state" input to the agent. As used herein, the term "action (A)," when used with reference to a driving experience, can refer to the action performed by the autonomous driver agent which can include lower level control signals like steering, throttle, brake values or higher-level driving decisions like "accelerate by x.y", "make a left lane change", "stop in z meters." As used herein, the term "reward (R)," when used with reference to a driving experience, can refer to a signal that signifies how desirable the autonomous driver agent's performed action (A) is at some given time and environment conditions. This can be computed automatically based on the rules of the road, and good driving principles which in turn can be extracted from human driving data or defined using other appropriate methods based on the prescribed traffic and road rules. As used herein, the term "next state ($S^\wedge$)," when used with reference to a driving experience, can refer to the state of the driving environment that results after the autonomous driver agent/car performs the action (A) in the driving environment. As used herein, the term "next observation ($O^\wedge$)," when used with reference to a driving experience, can refer to the whole or partial information contained in the next state ($S^\wedge$). As used herein, the term "goal (G)," when used with reference to a driving experience, can refer to the goal or destination that the autonomous driver agent is intended to achieve/reach. As used herein, the term "instance information (I)," when used with reference to an driving experience, can refer to information containing the impact/priority of the experience from the agent's point of view at the time the experience was collected, as well as other meta information (if any) about that particular experience like the agent's belief in the value of taking action (A), confidence in making the decision to take action (A), etc.

Figure 5:
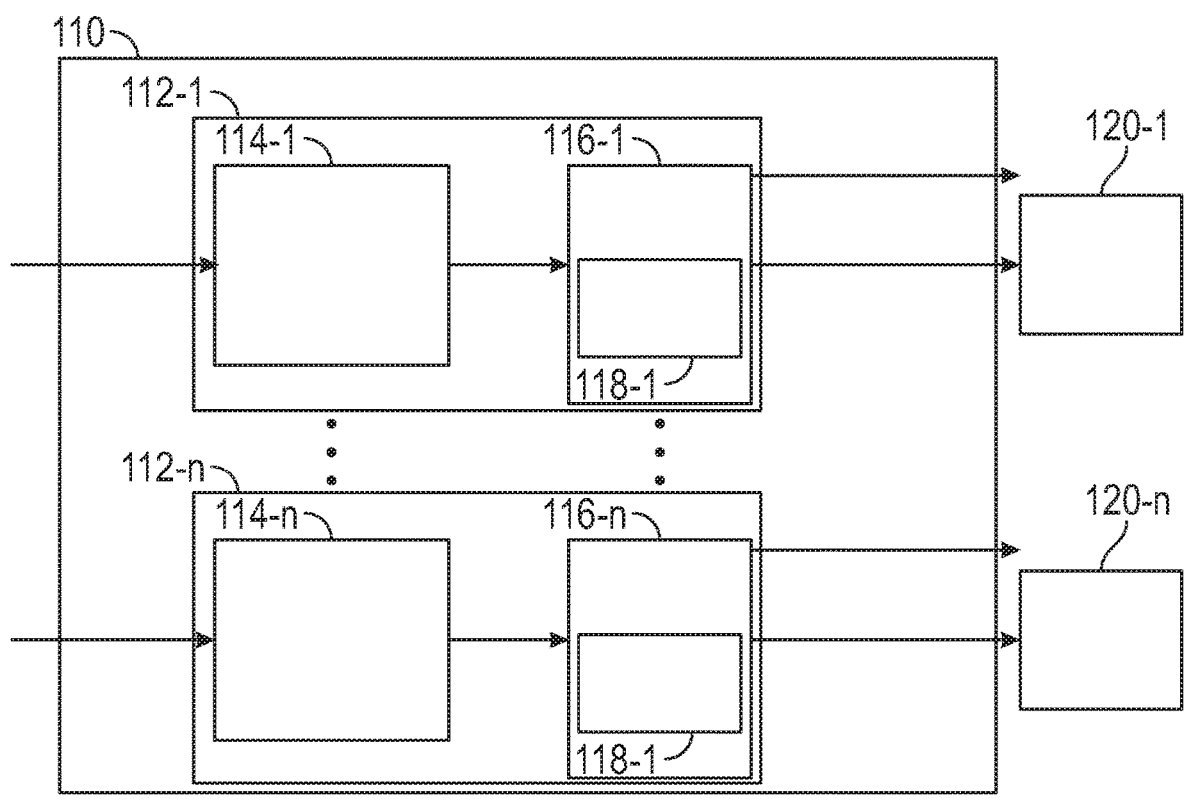
FIG. 5 is a block diagram that illustrates a system that includes a set of n of driving environment processors, a set of n of artificial intelligence (AI) based autonomous driver agent modules and illustrates interactions between the various driving environment processors and their corresponding the AI based autonomous driver agent modules based on the driving environments observed by the driving environment processors in accordance with the disclosed embodiments.

FIG. 5 is a block diagram that illustrates an AI driver agent system 110 that includes a set of n of driving environment processors 114, and a set of n of artificial intelligence (AI) based autonomous driver agent modules 116 in accordance with the disclosed embodiments. FIG. 5 illustrates interactions 112 between the various driving environment processors 114 and their corresponding the AI based autonomous driver agent modules 116 based on the driving environments observed by the driving environment processors 114. As shown in FIG. 5, each driver agent 116-1 . . . 116-n follows a policy 118-1 . . . 118-n to drive a vehicle in a particular driving environment as observed by a corresponding driving environment processor 114-1 . . . 114-n. Each policy 118 can process state (S) of the driving environment (as observed by a corresponding driving environment processor 114), and generate actions (A) that are used to control a particular AV that is operating in that state (S) of the driving environment. The variations in the driving environment can include, for example different start/goal positions, different traffic configurations, different road configurations, different lighting/weather/visibility conditions, etc. In one embodiment, each policy 118 is a policy developed through Deep Reinforcement Learning (DRL), and can therefore be referred to as a DRL-policy. In one embodiment, the policies 118 (labeled as DRL-Policy 1 through n) can be initially sampled from a pool of policies that can be obtained from human driving data. The policies 118 can then be improved over time using the driving policy learners 131. In one embodiment, the actions (A) generated by the driver agents 116-1 . . . 116-n are sent to a low-level controller 120-1 . . . 120-n. Depending on the implementation, the low-level controllers can represent a single low-level controller in a single vehicle, or different low-level controllers in different vehicles. Each low-level controller 120-1 . . . 120-n can process an action to generate commands that control one or more of actuator devices in accordance with the action to schedule and execute one or more control actions to be performed to automatically control the autonomous vehicle and automate the autonomous driving task encountered in a particular driving scenario (e.g., to achieve one or more particular vehicle trajectory and speed profiles). To explain further with reference to FIGS. 1 and 3, the actions of FIG. 5 are equivalent to the control signals 72 of FIG. 3. As described above with reference to FIG. 3, in one embodiment, the actuator system 90 includes a low-level controller and a plurality of actuators of the vehicle (e.g., a steering torque or angle controller, a brake system, a throttle system, etc.). Each low-level controller 120-1 . . . 120-n of FIG. 5 processes the action (or control signals 72 of FIG. 3) to generate signals or commands that control the actuators (actuator devices 42a-42n of FIG. 1) in accordance with the action (or control signals 72 of FIG. 3) to schedule and execute one or more control actions to be performed to automate driving tasks. The action (or control signals 72 of FIG. 3) specify or map to control actions and parameters that are used to schedule the one or more scheduled actions to be performed to automate driving tasks. The one or more control actions automatically control the autonomous vehicle to automate an autonomous driving task encountered in a particular driving scenario (e.g., to achieve a particular vehicle trajectory and speed profile). Further details regarding the operation of driver agents 116-1 . . . 116-n will be described below with reference to FIG. 6.

Figure 6:
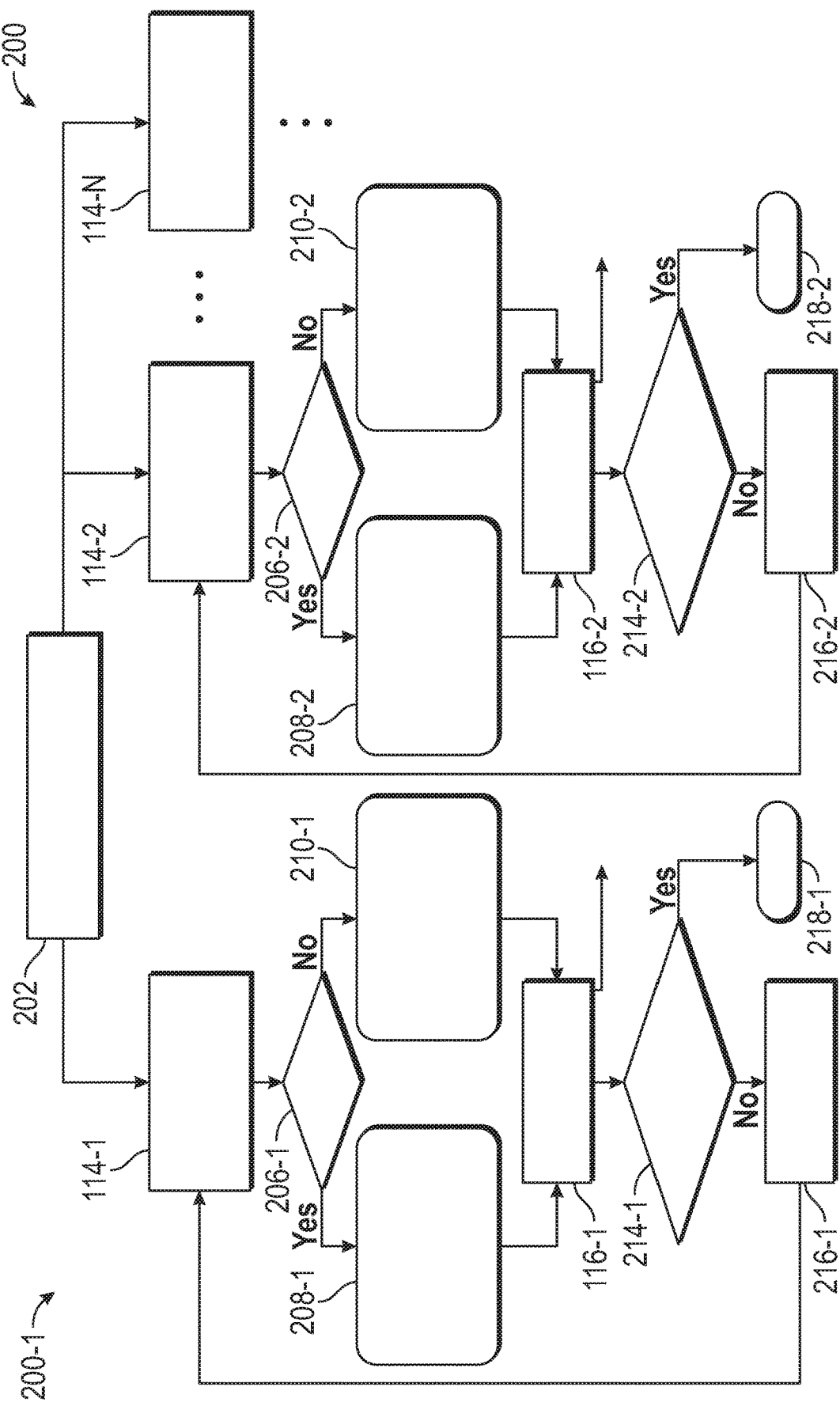
FIG. 6 is a flow chart that illustrates a method of processing performed by driver agent(s) operating in different driving environments (1 . . . n) in accordance with the disclosed embodiments.

FIG. 6 is a flow chart that illustrates a method 200 of processing performed by driver agent(s) 116-1 . . . 116-n operating in different driving environments (1 . . . n) as observed by a corresponding driving environment processor 114-1 . . . 114-n in accordance with the disclosed embodiments. FIG. 6 will be described with continued reference to FIGS. 4A-5. With respect to FIG. 6, the steps of the method shown are not necessarily limiting. Steps can be added, omitted, and/or performed simultaneously without departing from the scope of the appended claims. The method 200 may include any number of additional or alternative tasks, and the tasks shown need not be performed in the illustrated order. The method 200 may be incorporated into a more comprehensive procedure or process having additional functionality not described in detail herein. Moreover, one or more of the tasks shown could potentially be omitted from an embodiment of the method 200 as long as the intended overall functionality remains intact. The order of operation within the method 200 is not limited to the sequential execution as illustrated in FIG. 6, but may be performed in one or more varying orders as applicable and in accordance with the present disclosure. In various embodiments, the method 200 can be scheduled to run based on one or more predetermined events, and/or can run continuously during operation of the autonomous vehicle(s) 10. Further, the method 200 is computer-implemented in that various tasks or steps that are performed in connection with the method may be performed by software, hardware, firmware, or any combination thereof. For illustrative purposes, the following description of each method may refer to elements mentioned above in connection with FIGS. 1, 3, and 4A-5. In certain embodiments, some or all steps of these methods, and/or substantially equivalent steps, are performed by execution of processor-readable instructions stored or included on a processor-readable medium. For instance, in the description of FIG. 6 that follows, various modules can be described as performing various acts, tasks or steps, but it should be appreciated that this refers to processing system(s) of these modules executing instructions to perform those various acts, tasks or steps. Depending on the implementation, some of the processing system(s) can be centrally located, or distributed among a number of processors or controllers that work together.

The method 200-1 begins at 202, where the AI driver agent system 110 is initialized. During the initialization phase (at 202), a goal (G) is generated based on the preference of user, passenger, good-delivery, mobility-service or other-transport-request. The method 200 includes several instances of processing sequences that can be performed by different driver agents 116-1 . . . 116-n. For illustration purposes, due to page constraints, the method 200 shows two instances of processing performed by driver agents, which are performing similar processing steps 204-1 through 218-1 and steps 204-2 through 218-2, but it should be appreciated that any number of driver agents 116-1 . . . 116-n can be initialized at 202 and executed depending on the implementation. Because the processing steps 204 through 218 that are performed by each combination of driving environment processor 114 and driver agent 116 are the same, only processing steps 204-1 through 218-1 that are being performed by the driving environment processor 114-1 and driver agent 116-1 in driving environment 1 will be described as method 200-1, which is part of method 200. It should be appreciated; however, that each other instance of driver agents that are initialized at 202 can perform similar processing steps with respect to their corresponding environment.

At step 204-1, the driving environment processor 114-1 performs processing of sensor information that describes driving environment 1. The sensor information that describes driving environment can include information that can be acquired using the vehicle's on-board sensors including but not limited to cameras, radars, lidars, V2X communication and other sensors described herein.

At 206-1, the driving environment processor 114-1 determines whether a reset condition has occurred. As used herein, a "reset condition" can refer to a condition that requires a restart or reinitialization of the process. Examples of reset conditions can include, for example, information that indicates (1) the start of a new trip, (2) the start of a new route, (3) that a destination has been reached, (4) the goal/destination has been changed.

When the driving environment processor 114-1 determines (at 206-1) that a reset condition has occurred, the method 200-1 proceeds to 208-1, where driving environment processor 114-1 generates a state (S) and an observation (O), and then proceeds to 116-1, where the driver agent 116-1 processes the information generated at 208-1 to take an action (A), and also generates an instance of an driving experience (described above) that can be sent to one or more of the experience memory 120, the driving policy generation module 130 and/or the policy server 150. By contrast, when the driving environment processor 114-1 determines (at 206-1) that a reset condition has not occurred, the method 200-1 proceeds to 210-1, where the driving environment processor 114-1 generates a reward (R), a next state (S^') and a next observation (O^'), and then proceeds to 116-1, where the driver agent 116-1 processes the information generated at 210-1 to generate Instance information (I) that indicates the priority of the experience, and takes an action (A). In addition, the driver agent 116-1 canalso generate an instance of an driving experience (described above) that can be sent to one or more of the experience memory 120, the driving policy generation module 130 and/or the policy server 150.

At 214-1, the driver agent 116-1 determines whether a goal (G) has been reached, achieved or completed. The goal can vary depending on the driving scenario in a particular situation. Examples of a goal being reached can include, for example, (1) completing or ending of a trip, route, trajectory or path, (2) reaching a target or destination, etc. When the driver agent 116-1 determines that the goal (G) has been reached, achieved or completed, the method 200-1 proceeds to 218-1, where the method 200-1 ends.

When the driver agent 116-1 determines that the goal (G) has not been reached, achieved or completed, the method 200-1 proceeds to 216-1, where the driver agent 116-1 determines and takes a next action (A^') to be taken, and executes the next action (A^').

Experience Memory

As described above with reference to step 212 of FIG. 6, driving experiences collected or gathered by each of the driver agents 116-1 . . . 116-n can be sent to an experience memory 120 and stored at the experience memory 120. This allows the driving experiences provided from each of the driver agents 116-1 . . . 116-n to be pooled together at experience memory 120. The driving experiences 122 collected by different driver agents 116-1 . . . 116-n from diverse driving environments 114 represent a growing pool of facts and knowledge about driving scenarios. The driving experiences 122 can be stored in the experience memory 120 along with some optional meta information (e.g., priority as determined by the agent 116-1 . . . 116-n, an agent identifier (AgentID), an environment identifier (envID)). Depending on the implementation, the experience memory 120 can be provided with driving experiences by a plurality of different AVs (as in FIG. 4B), or by a single AV (as in FIG. 4C).

Depending on the implementation, the experience memory 120 can be implemented using a queue, priority queue, a differentiable neural computer or another suitable dynamic memory system. Features and characteristics of the experience memory 120 and how other components interact with the experience memory 120, will be described in greater detail below, for example, with reference to FIGS. 7-10.

Figure 7:
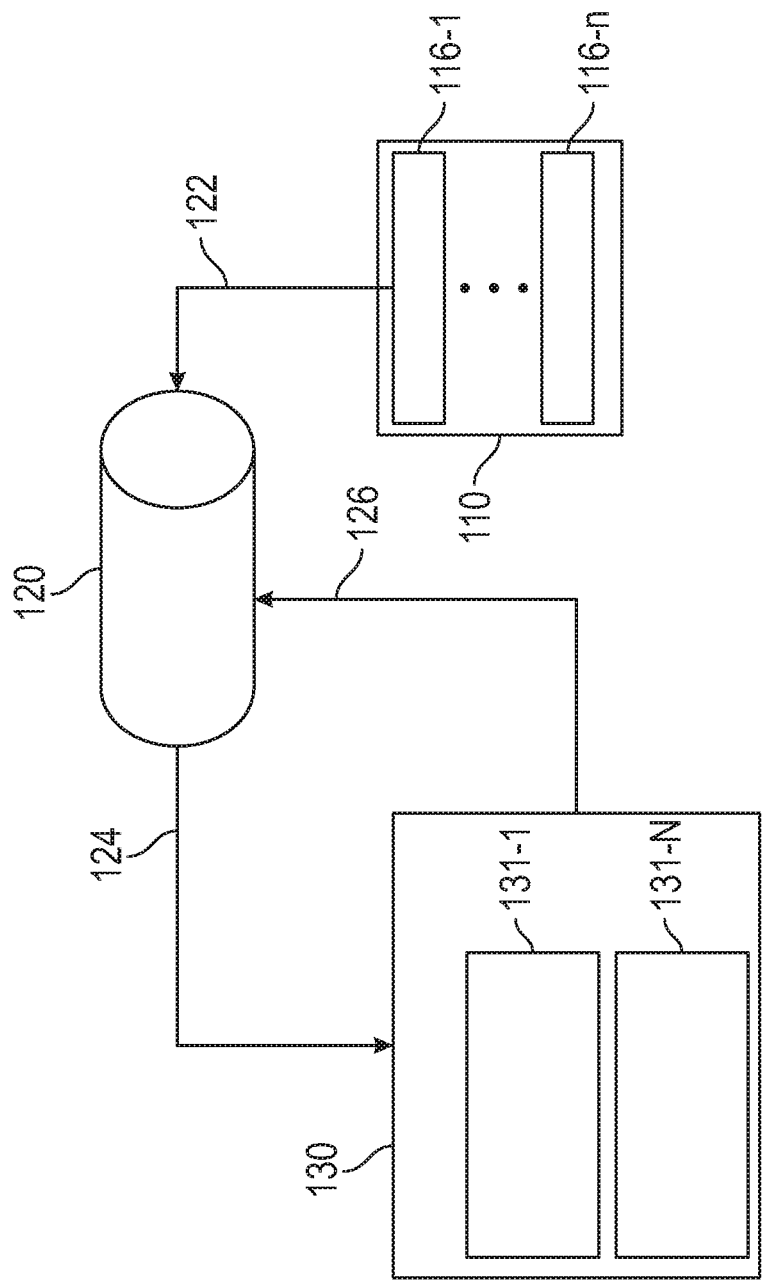
FIG. 7 is a block diagram that illustrates interaction between experience memory and the AI driver agent module and the driving policy generation module in accordance with the disclosed embodiments.

FIG. 7 is a block diagram that illustrates interaction between experience memory 120 and the AI driver agent system 110 and the driving policy generation module 130 in accordance with the disclosed embodiments. As described above, the AI driver agent system 110 includes a number of driver agents 116-1 . . . 116-n that can gather and store different driving experiences 122 at the experience memory 120. The driving policy generation module 130 includes a number of driving policy learner module(s) 131 that can retrieve the driving experiences 124 from the experience memory 120 and process the driving experiences 124 using policy learning algorithms to improve the policies. In one embodiment, the driving experiences collected by each driver agent 116-1 . . . 116-n can be stored in priority order (e.g., in an order that is ranked based on novelty/priority of each driving experience as determined by a prioritization algorithm 134 of the driving policy generation module 130). For example, the driving policy generation module 130 can update the relative priority/novelty/impact/effectiveness 126 of the driving experiences 124 in the experience memory 120, and then rank the driving experiences in a priority order. In one embodiment, when a driver agent 116 acquires a driving experience, it adds its own estimate of the priority as the Instance information (I) as described. The driving policy learner module(s) 131, which have access to much more information through the pooled experience memory 120, can update a value of priority/novelty/impact/effectiveness so that driving experiences with higher novelty/impact/effectiveness/priority are retrieved more often when they are sampled from the experience memory 120. This adds some "weightage" to the driving experiences based on their importance/novelty/impact/effectiveness in learning to achieve the desired goal(s). In addition, by doing so, the driving experiences 122 can be recycled/disposed of based on recency, and/or impact/priority values 126 that are updated by the driving policy generation module 130. For instance, low priority and commonly occurring driving experiences can be discarded to reduce volume of the driving experiences stored. This allows the experience memory 120 to manages which policies are stored in the experience memory and the order in which they are prioritized so as to retain as much information as possible within the capacity limits of the experience memory. Further details regarding the processing performed to update the experience memory 120 will now be described below with reference to FIG. 8.

Figure 8:
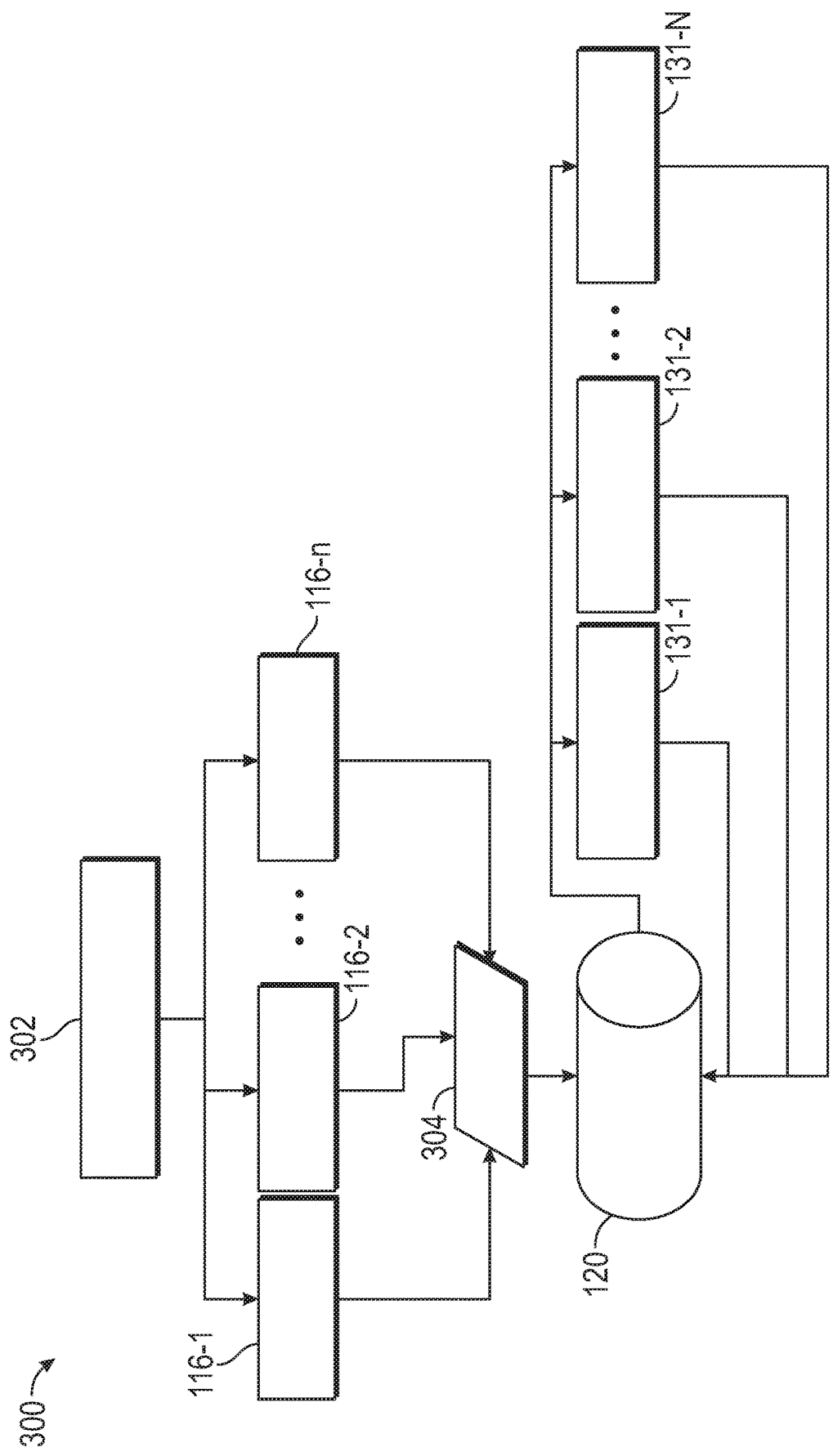
FIG. 8 is a flow chart that illustrates a method of processing performed by driver agent(s) and driving policy learner modules to update experience memory in accordance with the disclosed embodiments.

FIG. 8 is a flow chart that illustrates a method 300 of processing performed by driver agent(s) 116-1 . . . 116-*n* and driving policy learner modules 131 to update experience memory 120 in accordance with the disclosed embodiments. FIG. 8 will be described with continued reference to FIGS. 4A-7. With respect to FIG. 8, the steps of the method shown are not necessarily limiting. Steps can be added, omitted, and/or performed simultaneously without departing from the scope of the appended claims. The method 300 may include any number of additional or alternative tasks, and the tasks shown need not be performed in the illustrated order. The method 300 may be incorporated into a more comprehensive procedure or process having additional functionality not described in detail herein. Moreover, one or more of the tasks shown could potentially be omitted from an embodiment of the method 300 as long as the intended overall functionality remains intact. The order of operation within the method 300 is not limited to the sequential execution as illustrated in FIG. 8, but may be performed in one or more varying orders as applicable and in accordance with the present disclosure. In various embodiments, the method 300 can be scheduled to run based on one or more predetermined events, and/or can run continuously during operation of the autonomous vehicle(s) 10. Further, the method 300 is computer-implemented in that various tasks or steps that are performed in connection with the method may be performed by software, hardware, firmware, or any combination thereof. For illustrative purposes, the following description of each method may refer to elements mentioned above in connection with FIGS. 1, 3, 4A-7. In certain embodiments, some or all steps of these methods, and/or substantially equivalent steps, are performed by execution of processor-readable instructions stored or included on a processor-readable medium. For instance, in the description of FIG. 8 that follows, various modules can be described as performing various acts, tasks or steps, but it should be appreciated that this refers to processing system(s) of these modules executing instructions to perform those various acts, tasks or steps. Depending on the implementation, some of the processing system(s) can be centrally located, or distributed among a number of processors or controllers that work together. For illustration purposes, the method 300 shows n instances of driver agents 116-1 . . . 116-*n* being instantiated, but it should be appreciated that any number of driver agents 116-1 . . . 116-*n* can be instantiated during initialization at 302 and executed depending on the implementation. Likewise, the method 300 shows n instances of driving policy learner modules 131-1 . . . 131-*n* being instantiated, but it should be appreciated that any number of driving policy learner modules 131-1 . . . 131-*n* can be instantiated during initialization at 302 and executed depending on the implementation. Further, it should be noted that the number of driver agents 116-1 . . . 116-*n* and driving policy learner modules 131-1 . . . 131-*n* that are instantiated does not necessarily have to be equal.

The method 300 begins at 302, where the system is initialized, which causes different driver agents 116-1 . . . 116-*n* and driving policy learner modules 131-1 . . . 131-*n* to be instantiated. Each driver agent 116-1 . . . 116-*n* can process policy parameters provided by the policy server 150 to execute one or more policies and generate one more driving experiences. The collective driving experiences generated by the different driver agents 116-1 . . . 116-*n* are collectively represented as driving experience data 304 in FIG. 8. The driving experience data 304 is stored in experience memory 120. As will be explained in greater detail below with reference to FIG. 11, each of the driving policy learner modules 131-1 . . . 131-*n* can perform a sampling operation to retrieve driving experiences from the experience memory 120, and perform processing on the retrieved driving experiences (that were retrieved by the particular learner module) to generate corresponding instance information (I) that is used to update the driving experiences stored at the experience memory 120. The instance information (I) can include updates to the priority and impact of each driving experience.

Driving Policy Learner Modules

The driving policy generation module 130 can include any number of driving policy learner modules 131. The driving policy generation module 130 tries to learn a globally optimal policy that can drive well under all the different scenarios. In other words, the ultimate objective of the driving policy generation module 130 and the driving policy learner modules 131 is to collectively learn the most optimal policy given all the experiences collected by the driver agents 116 from several different driving environments. At any given time, the driving policy learner modules 131 are trying to learn from experiences and optimize the policies to be globally optimal give all the experiences. The driving policy learner modules 131 can be executed/run in parallel to process driving experiences and generate policies that can be stored locally at a policy store 136, and provided to the policy server 150. Each policy can be represented using a set of policy parameters. Each policy maps a state to an action. Each driving policy learner module 131 can generate new policies, and parameter updates to improve those policies over time based on driving experiences provided from experience memory 120 or another source (e.g., the driver agents 116-1 . . . 116-*n*). For example, each driving policy learner module 131 can access collective driving experiences from the experience memory 120, and process these collective driving experiences to learn and improve policies that can be maintained at a policy store 136, and shared with the policy server 150.

In addition, the driving policy generation module 130 includes a prioritization algorithm 134 that is responsible for prioritizing driving experiences and updating the impact/priority of driving experiences as the driving experiences acquired by the driver agents 116-1 . . . 116-*n* and stored at the experience memory 120 change over time. To explain further, because some driving experiences are much more valuable than the others, a prioritization algorithm 134 of the driving policy generation module 130 can prioritize driving experiences and update the impact/priority of driving experiences. For example, in one embodiment, the driving policy generation module 130 includes a DRL-algorithm 132 that learns from all pooled driving experiences, and can prioritize driving experiences and update the impact/priority of driving experiences. In one embodiment, the prioritization algorithm 134 can analyze driving experiences provided by the driver agents 116-1 . . . 116-n in real-time. In another embodiment, the prioritization algorithm 134 can periodically sample driving experiences 124 from the experience memory 120, and determine their relative priority with respect to all other driving experiences.

The driving experiences that are updated by the driving policy generation module 130 can vary depending on the implementation. For example, in the embodiment illustrated in FIG. 4B, the driving policy generation module 130 can access the collective driving experiences stored at the experience memory 120, and process these collective driving experiences to learn and either generate new policies or improve existing policies that can be maintained at a policy store 136, and then shared with the policy server 150 and/or directly with one or more of the driver agents 116-1 . . . 116-n. In this embodiment, the driving policy learner module 131 includes a learning algorithm 132, which can be a deep reinforcement learning (DRL) algorithm, that learns from all pooled driving experiences that have been gathered by several autonomous vehicles driving in several different environments. By contrast, in FIG. 4C, the driving policy generation module 130 processes and learns from these pooled driving experiences to improve policies (stored at the policy store 136) based upon those driving experiences. In this embodiment, each driving policy learner module 131 can include a learning algorithm 132, which can be a deep reinforcement learning (DRL) algorithm, that learns from all of the pooled driving experiences that have been gathered during several different trips by a particular AV that has driven in several different environments.

Figure 9:
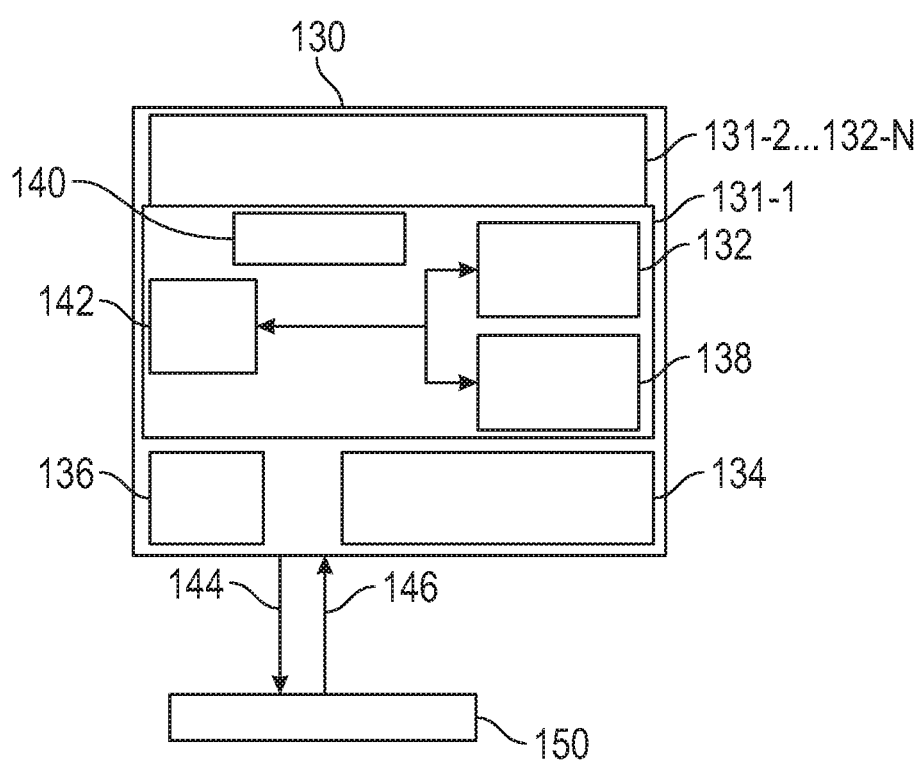
FIG. 9 is a block diagram that illustrates elements of a driving policy generation module and the interaction between the driving policy generation module and the policy server in accordance with the disclosed embodiments.

FIG. 9 is a block diagram that illustrates elements of a driving policy generation module 130 and the interaction between the driving policy generation module 130 and the policy server 150 in accordance with the disclosed embodiments. As shown in FIG. 9, the driving policy generation module 130 includes at least one driving policy learner module 131-1 . . . 131-n, a prioritization policy 134 (e.g., used to implement a ranking or prioritization methodology for ranking/prioritizing driving experiences that are maintained within the experience memory 120), and a policy store 136 that stores parameters for each policy generated by driving policy learner module(s) 131. Although only one instance of a driving policy learner module 131 is shown in FIG. 9, it should be appreciated that the driving policy generation module 130 can include any number of driving policy learner module(s) 131 that can execute independently of each other and in parallel to process driving experiences retrieved from the experience memory 120. In FIG. 9, block 131-1 shows various sub-blocks 132, 138, 140, 142 that make up one instance of a driving policy learner module 131-1. However, in some implementations, the driving policy generation module 130 includes additional driving policy learner modules 131-2 . . . 131-n that are collectively represented in FIG. 9 by a single block. Each of the driving policy learner modules 131-2 . . . 131-n can include additional blocks like those in driving policy learner module 131-1. Depending on the implementation each driving policy learner module 131 can include identical sub-blocks 132, 138, 140, 142 that make up that instance of the driving policy learner module 131, or can include different sub-blocks 132, 138, 140, 142 that make up that instance of the driving policy learner module 131. For example, the DRL-algorithm 132 used in two different instances of the driving policy learner modules 131 can be the same DRL-algorithm or can be different DRL-algorithms.

Each driving policy learner module 131 can process driving experiences that it retrieves to generate policies. Any policies that are currently being evaluated and updated are stored at the policy store 136. In this way, the policy store 136 serves as working memory for the driving policy learner modules 131 where any policies that they are actively working on can be temporarily stored. At any given point in time, any policy that was is found to be optimal by one of the driving policy learner modules 131 can then be sent to the policy server 150 (at 144) and stored at the policy server 150. In addition, each driving policy learner module 131 can also retrieve (at 146) previously generated/learnt policies from the policy server 150 and then update them based on new driving experiences. Parameters for any new or updated policies are then available to be sent to the driver agents 116-1 . . . 116-n as candidate policies. In one embodiment, each driving policy learner module 131 includes a Deep Reinforcement Learning (DRL) algorithm 132, a learning target module 138, and a loss module 142.

Deep Reinforcement Learning

Reinforcement learning is a learning paradigm concerned with learning to control a system so as to maximize a numerical performance measure that expresses a long-term objective. What distinguishes reinforcement learning from supervised learning is that only partial feedback is given to the learner about the learner's predictions and or control actions. Further, the predictions and or the control actions may have long term effects through influencing the future state of the controlled system. Thus, time plays a special role. The goal in reinforcement learning is to develop efficient learning algorithms. Reinforcement learning agents interact with an environment by receiving an observation that characterizes the current state of the environment, and in response, performing an action. Reinforcement learning (RL) can be used by an agent to learn to control a vehicle from sensor outputs. Reinforcement learning differs from supervised learning in that correct input-output pairs are not presented, but instead a machine (software agent) learns to take actions in some environment to maximize some form of reward or minimize a cost. Taking an action moves the environment/system from one state to another.

Deep reinforcement learning (DRL) refers to any number of a machine learning technique that extend a reinforcement learning approach to learning of the entire process using deep learning techniques. Deep reinforcement learning (DRL) can be used to actively target problems that interact with the environment and learn by maximizing a scalar reward signal. An agent of a Deep Reinforcement Learning (DRL) algorithm uses a neural network (e.g., a convolutional neutral network that is used to recognize an agent's state) to select the action to be performed in response to receiving any given observation. Neural networks are machine learning models that employ one or more layers of nonlinear units to predict an output for a received input. A "deep neural network" is used to refer to a neural network with one or more hidden layers in addition to an output layer. The output of each hidden layer is used as input to the next layer in the network, i.e., the next hidden layer or the output layer. Each layer of the network generates an output from a received input in accordance with current values of a respective set of parameters.

To explain further, in DRL, the agent uses a deep neural network to learn the longterm value of a state/action. The DRL based agent can also use a deep neural network to learn the mappings between state and actions. By performing an action, the agent transitions from state to state. Executing an action in a specific state provides the agent with a reward (a numerical score). The neural network uses coefficients to approximate the function relating inputs to outputs, and learns to find the right coefficients, or weights, by iteratively adjusting those weights along gradients that promise less error. The goal of the agent is to maximize its total (future) reward. It does this by adding the maximum reward attainable from the future state to the reward in its current state, effectively influencing the current action by the potential reward in the future. The state-value is a weighted sum of the expected values of the rewards of all future steps starting from the current state.

Deep learning algorithms may require large amounts of labelled training data to generate a robust model that can be used for inference on testing data. RL algorithms learn from a scalar reward signal that is typically sparse, noisy and delayed. A DRL based agent can use a deep neural network (DNN), such as a convolutional neural network (CNN), a deep auto encoder such as a convolutional auto encoder (CAE), or other such neural network to represent its policy and or its state and action value functions. The selection of a particular DNN may be based on the sensor type, where a CNN may be used for imaging/ranging sensor data, and a CAE may be used for time sequenced sensor data, for example. In one embodiment, the DNN can be trained with a variant of a Q-learning algorithm, where weights are updated using stochastic gradient descent. Combining a DNN, such as a CNN, with Q-learning as a form of reinforcement learning may be referred to as a deep Q-network (DQN). Experience replay is another technique used to store the agent's experiences at each time step, $e_t=(s_t, a_t, r_t, s_{t+1})$ in a dataset $D=e_1, \ldots, e_N$. This dataset D can be pooled over many episodes into replay memory. Here, s denotes the sequence, a denotes the action, and r denotes the reward for a specific timestep.

Figure 10:
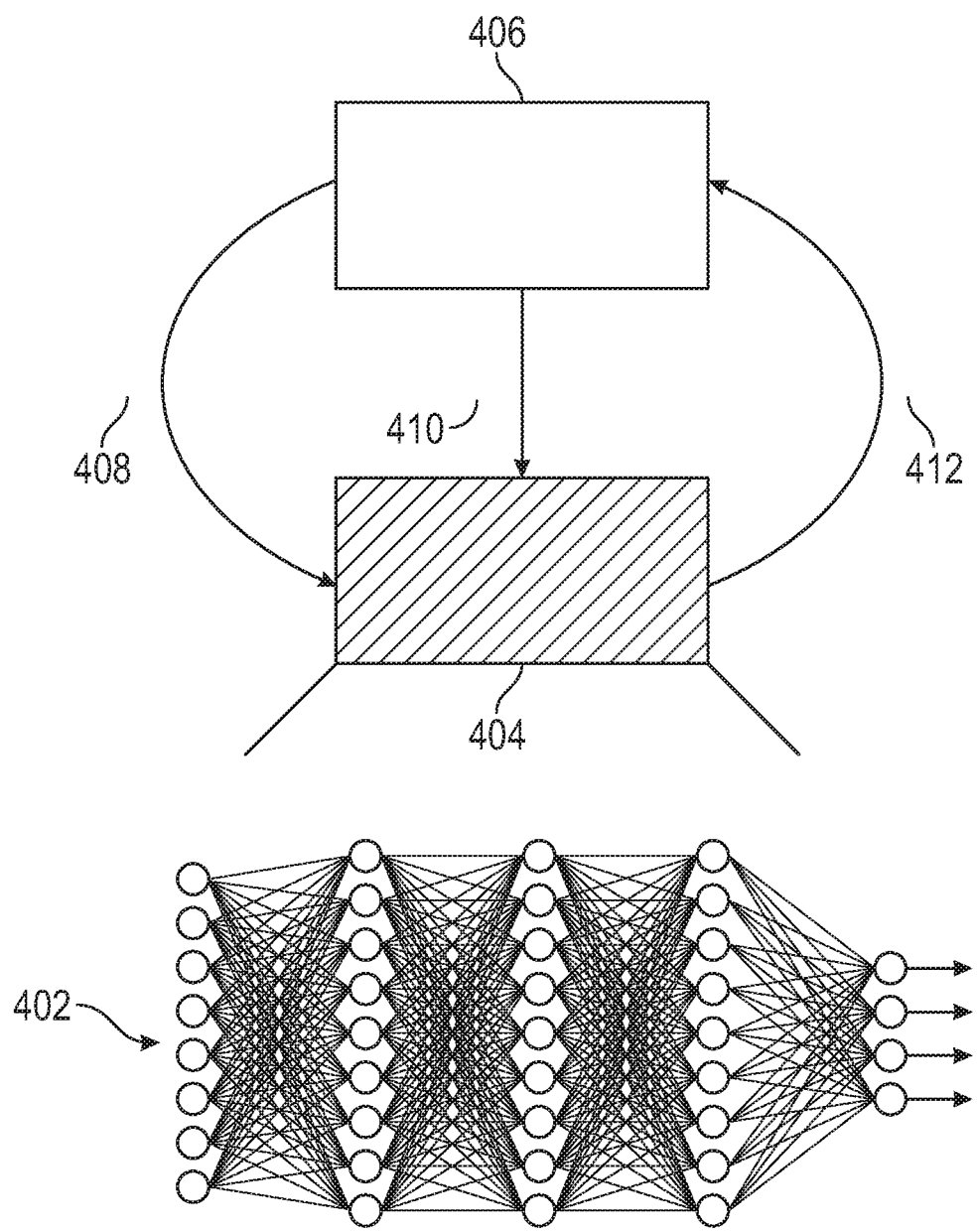
FIG. 10 is a block diagram that illustrates a DRL process with a DNN assuming the role of an agent with respect to environment.

FIG. 10 is a block diagram that illustrates a DRL process 400 with a DNN 402 assuming the role of an agent's value prediction mental model 404 with respect to environment 406. The environment 406 can supply observations 408, such as sensor data, and a reward 410 to the agent 404. After experience replay, the agent 404 selects and executes an action 412 as per a pre-defined greedy policy. The environment 406 can be a wide range of environments, such as a roadway environment or any other environment where observations 408 can be made during an autonomous driving task.

As one example, the DNN 402 can be can be implemented as a CNN including a feedforward artificial neural network that has more than one layer of hidden units between its inputs and outputs. Each hidden unit, j, uses a nonlinear mapping function, often the logistic function, to map its total input from the layer below, $x_j$, to the scalar state, $y_j$, that it sends to the layer above, where bj is the bias of unit j, i is an index over units in the layer below, and $w_{ij}$ is the weight to unit j from unit i in the layer below. The values of $y_j$ and $x_j$ can be computed as: $y_j=1/1+e^{-x_j}$ where $x_j=b_j+\Sigma_i y_i w_{ij}$.

Convolution in a CNN can be performed at convolutional layers to extract local structure features from the features of the previous layer. An additive bias can be applied at this point followed by a local pooling step. A nonlinear mapping (e.g., a sigmoid) can be applied after either the convolution or pooling layer and can vary by implementation. The convolution and pooling steps can be iteratively repeated.

In the example DRL process 400, weights can be updated with each step of the experience permitting greater data efficiency. Randomizing samples can break a strong correlation between the samples and thus reduces the variances in the weight updates. The next set of parameters fed to a training phase is determined by the set of current parameters and the pre-defined policy. Experience replay can average behavior distribution over many of its previous states thus smoothing the learning and avoiding oscillations/divergence in the parameters.

Reinforcement learning can be performed using policy classes that may represent any behavior without extensive hand-engineering. Learning hierarchical structures in control and reinforcement learning can improve generalization and transfer. Multilayer neural networks, such as autoencoders (e.g., CAEs) and CNNs, can be applied to a number of perception tasks. Policy search methods can allow systems to learn control policies for a wide range of tasks. A guided policy search approach transforms a policy search into a supervised learning problem, where a training set (which guides the policy search to regions of high reward) is generated by trajectory-centric algorithms. Training data from the policy's own state distribution helps to reduce the risk of compounding errors. An iterative procedure can be used to adapt the trajectories to the policy, alternating between optimizing the policy to match the trajectories, and optimizing the trajectories to minimize cost and match the policy, such that at convergence, the same state distribution is achieved.

Referring again to FIG. 9, the DRL algorithm 132 can be implemented using, for example, any type of policy-gradient-based reinforcement learning algorithms (e.g., Proximal Policy Optimization (PPO), any variant of Actor-Critic algorithms, deterministic policy gradients, etc.), or any type of value-based reinforcement learning algorithms (e.g., Q learning, advantage learning, etc.). DRL algorithms are described, for example, in the following publications: Richard S. Sutton and Andrew G. Barto. Reinforcement Learning: An Introduction (2nd Edition). 2016. 1998. MIT Press.; Csaba Szepesvári. Algorithms for Reinforcement Learning. 2010. Morgan & Claypool Pulishers; and Kai Arulkumaran, Marc P. Deisenroth, Miles Brundage, Anil A. Barath, A Brief Survey of Deep Reinforcement Learning, IEEE Signal Processing Magazine, 2017, which are incorporated by reference herein in their entirety. All patent applications, patents, and printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

The DRL algorithm 132 can process data relating to driving experiences using stochastic gradient updates to train a deep neural network (DNN), such as a convolutional neural network (CNN). A convolutional neural network (CNN) is a class of deep, feed-forward artificial neural networks. They are also known as shift invariant or space invariant artificial neural networks (SIANN), based on their shared-weights architecture and translation invariance characteristics. A CNN architecture is formed by a stack of distinct layers that transform the input volume into an output volume through a differentiable function. A few distinct types of layers are commonly used called convolution layers and max-pooling layers. A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. Max-pooling is often structured via Fukushima's convolutional architecture. Fukushima, K. (1980). "*Neocognitron: A self-organizing neural network model for a mechanism of pattern recognition unaffected by shift in position*". Biol. Cybern. 36 (4): 193-202. This architecture allows CNNs to take advantage of the 2D structure of input data. As such, CNNs are suitable for processing visual and other two-dimensional data. They can be trained with standard backpropagation. CNNs are easier to train than other regular, deep, feed-forward neural networks and have many fewer parameters to estimate.

Each policy prescribes a distribution over a space of actions for any given state. The DRL algorithm 132 processes input information from driving experiences 122 (gathered by the driver agents 116-1 . . . 116-n from several driving environments 114) to generate an output that optimizes the expected discounted future rewards for each driver agent 116-1 . . . 116-n. The DRL algorithm 132 outputs parameters representing a policy (e.g., new policy parameters for a new policy or updated policy parameters for an existing policy). Depending on the implementation, the policy parameters can one or more of: (1) estimated (or predicted) values of state/action/advantage as determined by a state/action/advantage value function (i.e., estimate of how good it is to be in this state; estimate of how good an action is in this state; or estimate of an advantage of taking some action in this state); or (2) a policy distribution. The state/action/advantage value function(s) are used by the DRL algorithm 132 to produce policies (or parameters for policies) which are eventually used by the driving agents 116. The value functions are more like what the learners have learnt from their vast experiences collected by the driving agents from several different environments over a long period of time. The value functions are like the understanding of the world (driving environments). As such, unique policies 118 can be generated for each driver agent 116 to optimize performance of that driver agent 116 while operating in a certain driving environment and driving scenario and following that particular policy.

Based on interactions of the driver agent with the driving environment, the learning target module 138 processes the trajectories of the driver agent resulting from the driver agent's interactions with the driving environment to compute desired learning targets that should be achieved. Each step in the trajectory includes: {state/observation, action, reward, next-state/next-observation}. The number of steps is a variable "n.". Depending on the implementation, the learning targets determined by the learning target module 138 can include (1) value targets (an estimated value of a state/action/advantage) that should be achieved; and/or (2) policy objective(s) that should be achieved. For example, if the DRL algorithm 132 learns and produces estimated values of state/action/advantage, then the learning target module 138 should generate value targets. If the DRL algorithm 132 learns and produces a policy distribution, then the learning target module 138 should generate policy objectives. The learning targets help drive internal estimated values used by the learning target module 138 to drive the internal learning process of the learning target module 138. As new states of the environments are observed/visited by the driver agent, the estimated value of taking a particular action in that state becomes less reliable if it has not experienced such a scenario/situation before.

The loss module 142 processes the learning targets output by the learning target module 138 and the output of the DRL algorithm 132 (e.g., estimated values of state/action/advantage or policy distribution) to generate "losses" that reflect the difference between the learning target that is desired (or trying to be achieved) and the output of the DRL algorithm 132 that is currently being achieved. In one embodiment, the loss module 142 comprises a loss function (not illustrated) and an automatic differentiation module (not illustrated).

A loss function is a function that maps an event or values of one or more variables onto a real number intuitively representing some "cost" associated with the event. Loss functions are used to measure the inconsistency between a predicted value and an actual value, or the inconsistency between a predicted value and a target value. Based on a metric implemented using the loss function, the loss function processes a batch of inputs (e.g., all of the learning targets from the learning target module 138, and all of the predictions from the DRL algorithm 132) to compute an overall output loss. As such, the overall output loss combines the losses for all the outputs of the DRL algorithm 132. When the DRL algorithm is an actor-critic based reinforcement learning algorithm, in which the critic predicts the state/action/advantage value function and the actor produces a policy distribution, the loss is the overall combined loss for both the actor and the critic (for the batch of inputs).

The loss function can be implemented using any known type of loss function such as Mean Squared Error (MSE) (or quadratic) loss function; a Mean Squared Logarithmic Error (MSLE) loss function; a Mean Absolute Error (MAE) loss function; a Mean Absolute Percentage Error (MAPE) loss function; a Kullback Leibler (KL) Divergence loss function; a Cross Entropy or Multi-class Cross Entropy loss function; a Negative Log Likelihood loss function; a Cosine Proximity loss function; a Hinge Loss or max-margin objective loss function.

In one embodiment, the loss function is configured to process the learning targets output by the corresponding learning target module 138 and the output of the corresponding DRL algorithm 132 to compute an overall output loss. The overall output loss comprises instances of loss data, where each instance of loss data reflects the difference between a learning target that is desired and a corresponding prediction or policy parameter output by the DRL algorithm.

The automatic differentiation module is configured to process the overall output loss to generate gradient data for each parameter. The automatic differentiation module performs automatic differentiation by differentiating the overall output loss computed by the loss function with respect to each of the parameters (e.g., using a computation graph and chain rule) to obtain gradient data for each parameter with respect to overall output loss. It should be appreciated that the loss function computes the overall loss based on outputs from the last layer of a neural network, and that the gradient data computed by the automatic differentiation module is backpropagated to previous layers (i.e., hidden layers and input layer) of that same neural network to retrain the neurons.

In one embodiment, the automatic differentiation module can process each instance of loss data (from the overall output loss) by performing automatic differentiation on each instance of loss data to generate gradient data for each parameter of each neural network of DRL algorithm 132 with respect to the overall output loss computed by the loss function (e.g., using differentiation and chain rule of differentiation commonly used with backpropagation-based learning in neural networks). Automatic differentiation (AD), also called algorithmic differentiation, is a family of techniques similar to but more general than backpropagation for efficiently and accurately evaluating derivatives of numeric functions expressed as computer programs. The gradient data for each parameter indicates the contribution of each parameter with respect to the overall output loss computed by the loss function. The gradient data represents gradients of each neuron in each neural network used by each DRL algorithm 132, where the gradients quantitatively define how much of a contribution each neuron made which resulted in the loss due to output of that neural network. Automatic differentiation is described, for example, in Atilim Gunes Baydin, Barak A. Pearlmutter, Alexey Andreyevich Radul, Jeffrey Mark Siskind. Automatic differentiation in machine learning: a survey. The Journal of Machine Learning Research, 18(153):1-43, 2018, which is incorporated by reference herein in its entirety.

Each of the driving policy learner modules further comprises a gradient descent optimizer 140. The gradient descent optimizer 140 is configured to process the gradient data for each parameter to compute updated parameters for each neural network used by the DRL algorithm 132 (e.g., updates for each parameter representing a policy). The updated parameters can be used to retrain and optimize neural network parameters of the DRL algorithm 132 and compensate for the overall output loss. The updated parameters are then available to be used by the driver agents, for example, to be served by the policy server 150 to the driver agents. The gradient descent optimizer 140 can be, for example, an adaptive learning rate method (e.g., RMSprop), or an Adaptive Moment Estimation (ADAM) algorithm that computes adaptive learning rates for each parameter. Gradient descent optimization algorithm algorithms are described, for example, in the following publication: Sebastian Ruder (2016). An overview of gradient descent optimisation algorithms. arXiv preprint arXiv:1609.04747 (Submitted on 15 Sep. 2016 (v1), last revised 15 Jun. 2017 (v2)), which is incorporated by reference herein in their entirety.

When the DRL algorithm 132 is a value-based reinforcement learning or actor-critic based reinforcement learning algorithms, the DRL algorithm uses a prediction of the state/action/advantage value to calculate loss and gradients and then uses the gradient descent optimizer to update the policy parameters which are then output to the other main components of the system. The predictions are used by the DRL algorithm 132 internally (depending on the DRL algorithm) to drive the learning and update the policy parameters. As such, the input to the loss module from the DRL algorithm 132 in these implementations are predictions or values (rather than policy parameters as in the case of a policy-gradient-based reinforcement learning algorithm). In one embodiment, when the DRL algorithm is a policy-gradient-based reinforcement learning algorithm, there are no value function predictions. Instead, the DRL algorithm 132 produces the policy distribution represented by a set of parameters that are directly optimized (by the gradient descent optimizer) using a policy loss function.

Any time a new policy is generated by one of the driving policy learner modules 131, the driving policy generation module 130 can send the new parameters 144 representing that new policy to the policy server 150. Similarly, any time the parameters for a policy are updated by one of the driving policy learner modules 131, the driving policy generation module 130 can send the updated parameters representing that policy to the policy server 150. The policy server 150 can then use the new/updated policy parameters 144 to improve the policy parameters for any policy that is sent to and utilized by the driver agents 116-1 . . . 116-*n*.

As explained above, the goal of the driving policy generation module 130 is to learn based on the experience and improve the policies. To begin the learning process, the driving policy generation module 130 needs to retrieve (at 146) a policy to evaluate and update from the policy server 150. To do so, the driving policy generation module 130 can periodically fetch or retrieve (at 146) policies/parameters from the policy server 150. In one non-limiting embodiment, the driving policy generation module 130 can determine which policies are currently being used or needed by the driver agents 116-1 . . . 116-*n*, and then fetch/retrieve one or more of those policies. In addition, as policies/parameters are updated at the policy server 150, the policy server 150 can periodically send (at 146) synchronization information to the driving policy generation module 130 so that any policies/parameters that have recently been updated by one of the driving policy learner modules 131-1 . . . 131-*n* can be provided to the other ones of the driving policy learner modules 131-1 . . . 131-*n*.

Further details regarding the operation of a particular driving policy learner module 131 of the driving policy generation module 130 will be described below with reference to FIG. 11.

Figure 11:
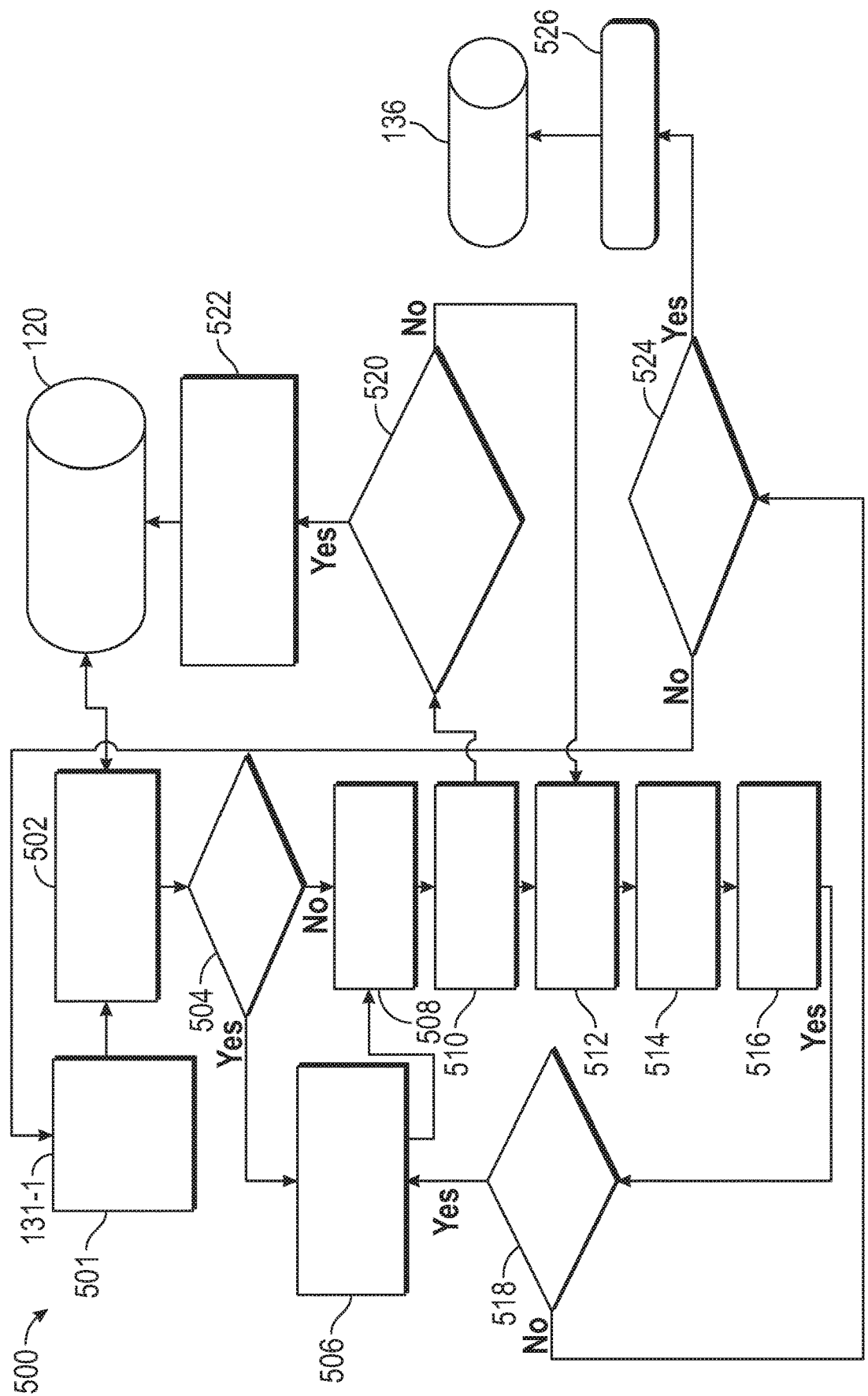
FIG. 11 is a flow chart that illustrates a method of processing performed by a particular driving policy learner module of the driving policy generation module to update experience memory and the policy store of the driving policy generation module in accordance with the disclosed embodiments.

FIG. 11 is a flow chart that illustrates a method 500 of processing performed by a particular driving policy learner module 131-1 of the driving policy generation module 130 to update experience memory 120 and the policy store 136 of the driving policy generation module 130 in accordance with the disclosed embodiments. FIG. 11 will be described with continued reference to FIGS. 4A-10. With respect to FIG. 11, the steps of the method 500 shown are not necessarily limiting. Steps can be added, omitted, and/or performed simultaneously without departing from the scope of the appended claims. The method 500 may include any number of additional or alternative tasks, and the tasks shown need not be performed in the illustrated order. The method 500 may be incorporated into a more comprehensive procedure or process having additional functionality not described in detail herein. Moreover, one or more of the tasks shown could potentially be omitted from an embodiment of the method 500 as long as the intended overall functionality remains intact. The order of operation within the method 500 is not limited to the sequential execution as illustrated in FIG. 11, but may be performed in one or more varying orders as applicable and in accordance with the present disclosure. In various embodiments, the method 500 can be scheduled to run based on one or more predetermined events, and/or can run continuously during operation of the autonomous vehicle(s) 10. Further, the method 500 is computer-implemented in that various tasks or steps that are performed in connection with the method may be performed by software, hardware, firmware, or any combination thereof. For illustrative purposes, the following description of each method may refer to elements mentioned above in connection with FIGS. 1, 3, 4A-10. In certain embodiments, some or all steps of these methods, and/or substantially equivalent steps, are performed by execution of processor-readable instructions stored or included on a processor-readable medium. For instance, in the description of FIG. 11 that follows, various modules can be described as performing various acts, tasks or steps, but it should be appreciated that this refers to processing system(s) of these modules executing instructions to perform those various acts, tasks or steps. Depending on the implementation, some of the processing system(s) can be centrally located, or distributed among a number of processors or controllers that work together. For illustration purposes, the method 500 shows processing performed by one instance of a particular driving policy learner module 131-1 that has been instantiated, but it should be appreciated that any number of driving policy learner modules 131can be instantiated and executed in parallel depending on the implementation.

The method 500 begins at 501, where the driving learner module 131-1 is enabled/activated and begins executing. The method 500 then proceeds to 502 where the driving learner module 131-1 samples and retrieves driving experiences from the experience memory 120, or alternatively, receives driving experiences directly from one or more of the driver agents 116-1 . . . 116-n. At 504, the driving learner module 131-1 determines whether synchronization with the policy server 150 is required.

When synchronization with the policy server 150 is not required (at 504), the method 500 proceeds to 508. As described above, the DRL algorithm 132 determines outputs that are either: (1) estimated (or predicted) values of state/action/advantage; or (2) a policy distribution. The learning target module 138 determines learning targets that are either (1) value targets; or (2) a policy objective. At 508, the driving learner module 131-1 computes learning errors or corrections based on the differences between learning targets (e.g., the value targets or the policy objective) and the outputs (e.g., the estimated values of state/action/advantage values or the policy distribution) as determined by the DRL algorithm 132. By contrast, when synchronization with the policy server 150 is required (at 504), the method proceeds to 506, where the driving learner module 131-1 selects parameters and synchronizes the selected parameters with the policy server 150, and the method 500 then proceeds to 508 where learning errors computed as described above. The method 500 then proceeds to 510, where the learning target module 138 computes a learning target, and then to 512, where the gradient data is computed by backpropagation. At 514, the gradient data and the learning errors (that were computed at 208) are back-propagated to retrain the neural network used to represent the policy and/or the state/action/advantage value function of the DRL algorithm 132. At 516, a gradient descent optimizer updates the policy parameters. At 518, the DRL algorithm 132 determines whether the updated parameters for the policy are to be synchronized with the policy server 150.

After computing the learning targets (at 510), the prioritization algorithm 134 of the driving learner module 131-1 determines, at 520, whether the impact/priority of the driving experience needs to be updated at the experience memory 120. When the prioritization algorithm 134 determines (at 520) that the impact/priority of the driving experience does not need to be updated, the method 500 loops to 512, where the gradient data is computed as described above. When the prioritization algorithm 134 determines (at 520) that the impact/priority of the driving experience needs to be updated, the method 500 proceeds to 522, where the prioritization algorithm 134 updates the impact/priority of the driving experience at the experience memory 120.

When the DRL algorithm 132 determines (at 518) that the updated parameters for the policy are to be synchronized with the policy server 150, the method 500 proceeds to 506, where the DRL algorithm 132 sends the updated parameters for the policy to the policy server 150. The policy server 150 can then use the new/updated policy parameters 144 to improve the policy parameters that are sent to and utilized by one or more of the driver agents 116-1 . . . 116-n.

When the DRL algorithm 132 determines (at 518) that the updated parameters for the policy do not need to be synchronized with the policy server 150, the method 500 proceeds to 524, where the DRL algorithm 132 determines whether the parameters for the policy are to be stored at the policy store 136.

When the DRL algorithm 132 determines (at 524) that the parameters for the policy do not need to be stored at the policy store 136, the method 500 proceeds to 501, where the driving learner module 131-1 is re-executed. When the DRL algorithm 132 determines (at 524) that the parameters for the policy are to be stored at the policy store 136, the method 500 proceeds to 526, where the DRL algorithm 132 stores the parameters for the policy are to be stored at the policy store 136.

Policy Server

Figure 12:
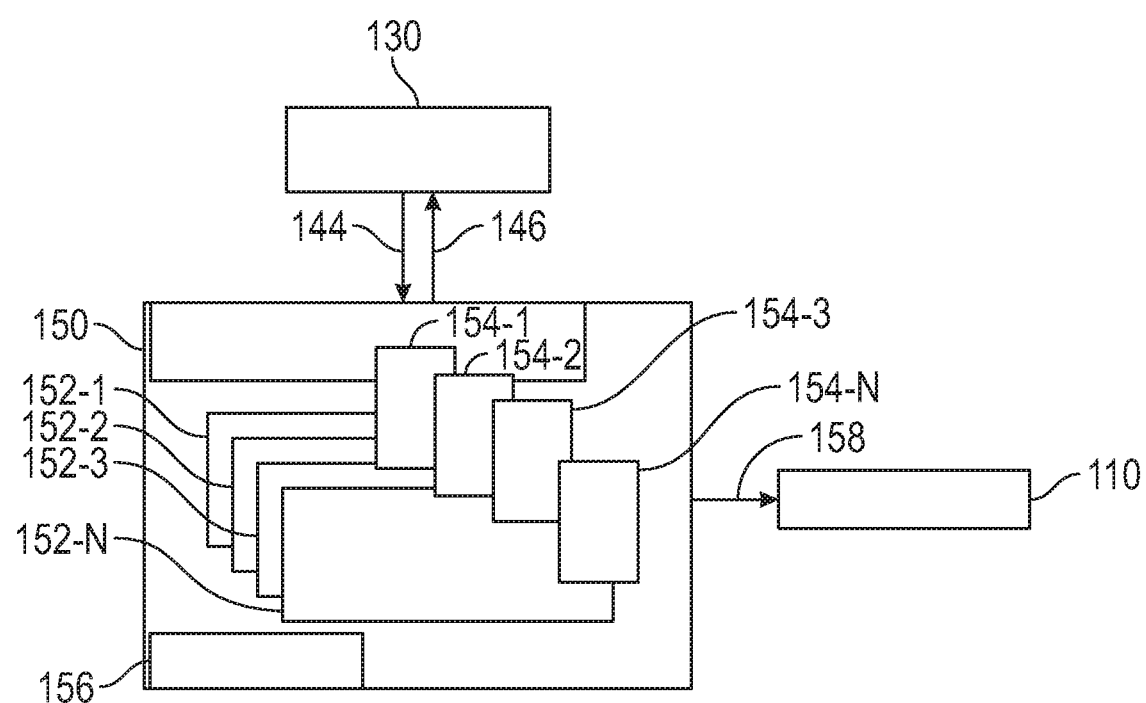
FIG. 12 is a block diagram that illustrates interaction between the policy server and the driving policy generation module and the AI driver agent module in accordance with the disclosed embodiments.

FIG. 12 is a block diagram that illustrates interaction between the policy server 150 and the driving policy generation module 130 and the AI driver agent system 110 (that comprises a set of n driver agents 116-1 . . . 116-n) in accordance with the disclosed embodiments.

The driving policy learner modules 131 of the driving policy generation module 130 can each generate a set of parameters that describe a policy. Any time a new policy is generated by one of the driving policy learner modules 131, the driving policy generation module 130 can send the new parameters for that new policy to the policy server 150. The parameters that define each policy can be updated over time by the driving policy learner modules 131 as they learn from new experiences captured by the driver agents 116. Any time the gradients and/or parameters for a policy are updated by one of the driving policy learner modules 131, the driving policy generation module 130 can send the updated parameters to the policy server 150. In FIG. 12, the policy parameters are collectively represented via arrow 144. The policy parameters 144 improve the policy parameters for any policy that is stored at the policy server 150.

As part of the learning process, the driving policy generation module 130 can retrieve (at 146) a policy to evaluate and update from the policy server 150. To do so, the driving policy generation module 130 can periodically fetch or retrieve (at 146) policies/parameters from the policy server 150. In one embodiment, each driving policy learner module 131 can retrieve (at 146) previously generated/learnt policies from the policy server 150 and then update them based on new driving experiences. In addition, as policies/parameters are updated at the policy server 150, the policy server 150 can synchronize parameters for the policies (at 146) stored at the policy store 156 so that the learning process is more stable. In one embodiment, the policy server 150 can periodically send (at 146) synchronization information to the driving policy generation module 130 so that any policies/parameters that have recently been updated by one of the driving policy learner modules 131-1 . . . 131-n can be provided to the other ones of the driving policy learner modules 131-1 . . . 131-n.

The new/updated policies each stored in a policy store 156 of the policy server 150 as a set of policy parameters. Each policy 118 specifies parameters that define the behaviors enacted by the vehicle. For example, each policy can be used by the particular driver agent 116 to instruct and control how actuators of the AV operate in response to a given set of sensor inputs. Each behavior/action performed by the vehicle can be traced back to the set of parameters that lead to that behavior or action to be performed. In one exemplary embodiment, where neural networks are used to represent the driving agent's policy and/or the state/action/advantage values, the parameters used are the weights of the neurons. The parameter information (the information-in/weights of each neuron) can be seen as being analogous to lines of code in computer programs. The traceability to the internal working/code of the system enables white-box type validation and testing of the vehicle.

The policy server 150 can provide parameters for one or more candidate policies 158 (represented by a single arrow labeled 158 in FIG. 12) to the driver agents 116-1 . . . 116-n of the AI driver agent system 110. The particular driver agent 116-1 . . . 116-n can use parameters for one of the candidate policies to execute a particular policy to control an AV when operating in a particular environment. The trigger for sending the parameters for one or more candidate policies 158 to the particular driver agents 116-1 . . . 116-n varies depending on the implementation, and the level of autonomy of the particular driver agent 116-1 . . . 116-n. In one embodiment, the particular driver agents 116-1 . . . 116-n can send a request for policies to the policy server 150 that includes meta information. The meta information is encoded information that describes the driving agent's goals, user/agent preferences, actively sensed driving conditions, route complexity etc., and the policy server 150 can determine, based on that meta information, which policies are suitable "candidates" for that particular driver agent 116-1 . . . 116-n, and then send corresponding parameters to that particular driver agent 116-1 . . . 116-n. In another embodiment, where the particular driver agent 116-1 . . . 116-n lacks capability/sophistication or the level-of-autonomy to determine such meta information needed to request specific policies, the policy server 150 can determine which policies are "candidates" for a particular one of the particular driver agents 116-1 . . . 116-n, and then send corresponding parameters to that particular driver agent 116-1 . . . 116-n.

For example, in one embodiment, based on driving environment specific sensory information observed and the goal of the driving agent provided from a particular driver agent 116-1 . . . 116-n, the policy server 150 can determine one or more candidate policies to be served to that particular driver agent. For each candidate policy, the policy server 150 can then instantiate a policy server instance 154-1 . . . 154-N that will serve one of the candidate policies to that particular driver agent 116-1 . . . 116-n. For example, each policy server instance 154-1 . . . 154-N will retrieve a corresponding set of parameters 152-1 . . . 152-n for a particular candidate policy and serve that set of parameters to that particular driver agent 116-1 . . . 116-n. The driver agents 116-1 . . . 116-n can then execute the policies to control the AV 10 (e.g., control actuators that control acceleration, deceleration, steering angle) in view the sensory observations.

The disclosed embodiments can provide scalable systems and methods for training and developing multitude of autonomous driver agents in a parallel and distributed manner without the need for any external supervision or labelled data. Collected experiences of the driver agents can be used as a knowledge base to extract driving rules and/or bootstrap new learning paradigms. Skills learned are transferable to other driving tasks and/or domains. Parallel and distributed architecture enables driving agents to find novel driving policies and behaviors. The explored behavior space can be used as an indicator for the AD domain coverage. The disclosed embodiments can allow for parallel and distributed learning, which can lead to faster development, testing, and validation. This can enable accelerated training of multiple autonomous intelligent driver agents. Driver agents can learn a variety of affordable policies, and these polices can be transferrable to related problems. This can enable large-scale (e.g., city/country-wide AV behavior validation.

It should be appreciated that while the autonomous driving policy generation and server system 100 can include the driving environment processors 114, the autonomous driver agents 116, the experience memory 120, the driving learner modules 130, and the policy server 150, in other embodiments not all of these elements are required.

For example, in one embodiment, a system is provided that includes the autonomous driver agents 116, and the policy server 150. This system will enable an aftermarket AV system to update/upgrade it's driving decision making policies that are made available through the policy server 150. The policies on the policy server 150 could be updated by any means (not necessarily using a driving learner module and/or an experience memory). Rigorous testing and validation methods can be employed to validate and verify the safety levels and other performance characteristics of the policies on the policy server once and can be deployed to millions of vehicles at scale. This system can allow for improvements to the majority of the current AV systems (in which the decision-making system is fixed at production time and stays the same for a considerable period of time until a major system/software update is performed on the AV system). The system can enable AV systems to constantly use an improved decision-making policy through a policy server. There is no need for them to implement an experience memory 120 or the driving learner modules 130. Eliminating the experience memory 120 can eliminate the need for storage of experiences. However, this system could also include the experience memory 120. This system can also eliminate the need for the driving learner modules 130 or a learning component. For example, once the system is fully trained for several use cases, driving environments, etc., and the trained policies are stored in the policy server 150, the autonomous driver agents 116 (for an AV or by a group of AVs) could access these policies stored in a policy store at the policy server 150; they would no longer need to collect and store experiences at an experience memory 120 or be involved in learning.

In another embodiment, a system is provided that includes at least one of the autonomous driver agents 116 and at least one of the driving learner modules 130. Autonomous driver agents 116 simply send experiences directly to the driving learner modules 130, driving learner modules 130 can learn based on information provided from the autonomous driver agents 116, and autonomous driver agents 116 can receive feedback from the driving learner modules 130 to update the autonomous driver agents 116. This is advantageous because the combination of autonomous driver agents 116 and the driving learner modules 130 is a simpler (with minimal number of components) method to apply reinforcement learning (RL) to solve the autonomous driving problem as a whole. This system could address autonomous driving decision making problems (e.g., planning and control) using Reinforcement Learning (RL). One advantage of this system is that there is no need to include the experience memory 120 or the policy server 150 (no need for storage of any type). However, this system could optionally also include the experience memory 120, but without the need for a policy server 150. A system that includes a combination of autonomous driver agents 116, an experience memory 120 and driving learner modules 130 (without the policy server 150) can be viewed as a system that allows different autonomous driver agents 116 to collect experiences, and store their collective experiences in a database of experiences that are stored in experience memory 120 (i.e., that stores experiences observed by all of the autonomous driver agents 116). The collective experiences can then be used by the driving learner modules 130 to learn based on experience information provided from all of the autonomous driver agents 116 and continuously update all of the autonomous driver agents 116 directly without relying on a policy server 150.

In another embodiment, a system is provided that includes the autonomous driver agents 116 and the experience memory 120. A system with experience memory 120 and one or more autonomous driver agents 116 (without a driving learner module 130 and associated learning process) is an experience gathering system, which could serve the purpose of collecting driving experiences. In any data-driven learning systems, data is a key element which can be commoditized and sold separately. Optionally, this system could also include the driving learner modules 130 (as described above), while eliminating the need for the policy server 150.

In another embodiment, a system is provided that includes the driving learner modules 130 and the policy server 150. This system can be used when a list of trained policies is available at the policy server 150. In the absence of new experiences coming in, the one or more driving learner modules 130 can use meta-learning/unsupervised-learning methods to "dream" and update the policies based on what they can infer from the various different policies available in the policy server 150. The method to "dream" can be part of learning algorithms implemented at the driving learner modules 130. This system does not require the experience memory 120, or require autonomous driver agents 116 to collect experiences. Such a system can be used to derive custom policies for custom scenarios by permuting and combining existing policies in the policy store available in the policy server 150. This may lead to policy by products that are useful to solve similar problems in the allied fields of driving (e.g., A policy derived using such a system may turn out to be useful to control a fork-lift or a goods cart autonomously on a factory floor). Optionally, this system could also include the experience memory 120, but still without the need for the autonomous driver agents 116 to collect experiences. The combination of driving learner modules 130 and the policy server 150 in conjunction with the experience memory 120 is useful because experiences stored at the experience memory 120 can augment the self-supervised/unsupervised/meta-learning ("dream") with real world experiences provided by experience memory 120. For example, one or more driving learner modules 130 can simply access an experience memory 120 having a bunch of information about experiences, and apply learning algorithms to those experiences and generate parameters for policies that can be stored at a policy server 150 (e.g., and sold to some end user). In addition, due to the presence of the experience memory 120 this combination will also allow further adaptation/refinement of the existing policies in the policy server 150 based on real-world experiences in addition to the imaginative experiences ("dreams") that the driving learner modules 130 can reconstruct. In either embodiment, this system can be implemented without a vehicle in the loop. This embodiment may potentially be useful in related industries as well. It may turn out to be a game changer for some applications (e.g., an AI system that is capable of generalizing to unforeseen scenarios using self-supervised/unsupervised/meta-learning).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

capturing, via one or more driver agents and one or more corresponding one or more driving environment processors, driving experiences during different driving scenarios in different driving environments, wherein each driving experience comprises data that represents a particular driving environment at a particular time;

retrieving, via one or more driving policy learner modules of a driving policy generation module, at least some of the driving experiences;

processing, at one or more driving policy learner modules, at least some of the driving experiences to learn and generate parameters that describe one or more policies, wherein each policy prescribes a distribution over a plurality of actions for any given state, and wherein each policy comprises a set of parameters that describe the policy and are processible by at least one of the driver agents to generate an action for controlling a vehicle;

processing, at the one or more driver agents, received parameters for at least one candidate policy, and executing the at least one candidate policy to generate one or more actions that control the vehicle in a specific driving environment as observed by a corresponding driving environment processor; and processing, at a low-level controller, each action to generate control signals for controlling the vehicle when operating in that specific driving environment, wherein the data for each driving experience that represents a particular driving environment at a particular time, comprises:

a state of the particular driving environment observed by a corresponding driving environment processor;

an observation made using at least part of an observable state;

an action generated by the driver agent;

a reward comprising: a signal that signifies how desirable an action performed by the driver agent is at a given time under particular environment conditions, wherein the reward is automatically computed based on road rules and driving principles extracted from human driving data or defined using other appropriate methods based on traffic and the road rules;

a goal to be achieved by the driver agent;

instance information comprising: information that indicates impact or priority of the driving experience as determined by that driver agent at the time that particular driving experience was acquired; and other meta information about that particular driving experience; and a next state of the particular driving environment that results after the driver agent performs the action in the driving environment and a next observation made using at least part of a next observable state.

2. The method according to claim 1, wherein processing, at the one or more driver agents, received parameters for at least one candidate policy, and executing the at least one candidate policy to generate one or more actions that control the vehicle in a specific driving environment as observed by a corresponding driving environment processor, comprises:

processing, at each of the driving environment processors, sensor information from on-board sensors that describes a specific driving environment to generate a state of the specific driving environment;

processing the state, at each of the one or more driver agents in accordance with a policy, to generate a corresponding action; and wherein processing, at a low-level controller, each action to generate control signals for controlling the vehicle to control the vehicle when operating in that specific driving environment, comprises:

translating, at the low-level controller, each action to generate the control signals for controlling the vehicle to autonomously control the vehicle when operating in that state in that specific driving environment.

3. The method according to claim 1, wherein each of the driving policy learner modules comprises a Deep Reinforcement Learning (DRL) algorithm, and wherein processing, at one or more driving policy learner modules, at least some of the driving experiences, comprises:

processing input information from at least some of the driving experiences, at each DRL algorithm, to learn and generate an output comprising: a set of parameters representing a policy that are developed through DRL, and wherein each policy is processible by at least one of the driver agents to generate an action for controlling the vehicle.

4. The method according to claim 3, wherein the output of the DRL algorithm comprises one or more of:
(1) estimated values of state/action/advantage as determined by a state/action/advantage value function; and
(2) a policy distribution.

5. The method according to claim 3, wherein each DRL algorithm comprises:
a policy-gradient-based reinforcement learning algorithm; or a value-based reinforcement learning algorithm; or an actor-critic based reinforcement learning algorithm.

6. The method according to claim 3, wherein each of the driving policy learner modules further comprises a learning target module, and wherein processing, at one or more driving policy learner modules, at least some of the driving experiences, further comprises:

processing, at each learning target module, trajectory steps of a driver agent within a driving environment to compute desired learning targets that are desired to be achieved, wherein each trajectory step comprises: a state, an observation, an action, a reward, a next-state and a next-observation, and wherein each learning target represents a result of an action that is desired for a given driving experience.

7. The method according to claim 6, wherein each of the learning targets comprises at least one of:
a value target that comprises: an estimated value of a state/action/advantage to be achieved; and
a policy objective to be achieved.

8. The method according to claim 6, wherein each DRL algorithm is configured to process data relating to driving experiences using stochastic gradient updates to train a neutral network comprising more than one layer of hidden units between its inputs and outputs, and wherein each of the driving policy learner modules further comprises a loss module and a gradient descent optimizer, wherein each loss module comprises: a loss function and an automatic differentiation module, and wherein processing, at one or more driving policy learner modules, at least some of the driving experiences, further comprises:

processing, via each loss function, the learning targets output by the corresponding learning target module and the output of the corresponding DRL algorithm to compute an overall output loss; and processing, at each automatic differentiation module, the overall output loss to generate gradient data for each parameter; and processing, at each gradient descent optimizer, the gradient data for each parameter to compute updated parameters representing a policy, wherein the gradient data represents gradients of each neuron in each neural network used by each DRL algorithm, and wherein the gradients quantitatively define how much of a contribution each neuron made which resulted in the loss due to output of that neural network.

9. The method according to claim 1, wherein each policy specifies a set of parameters that when executed by a particular driver agent define behaviors to be enacted by the vehicle by controlling actuators of the vehicle to operate in response to a given set of sensor inputs.

10. A system, comprising:
a driver agent module comprising: one or more driving environment processors each being configured to: observe a driving environment; and one or more driver agents each corresponding to one of the driving environment processors, and each being configured to:
execute a policy that controls a vehicle in a specific driving environment as observed by a corresponding driving environment processor for that driver agent module; and
capture driving experiences during different driving scenarios in different driving environments, wherein each driving experience comprises data that represents a particular driving environment at a particular time;
a driving policy generation module comprising: one or more driving policy learner modules each being configured to: retrieve at least some of the driving experiences, process at least some of the driving experiences to learn and generate parameters that describe one or more policies, wherein each policy prescribes a distribution over a plurality of actions for any given state, and wherein each policy comprises a set of parameters that describe the policy and are processible by at least one of the driver agents to generate an action for controlling the vehicle; and
a low-level controller configured to process each action to generate control signals for controlling the vehicle when operating in that specific driving environment, wherein the data for each driving experience that represents a particular driving environment at a particular time, comprises:
a state of the particular driving environment observed by a corresponding driving environment processor;
an observation made using at least part of an observable state;
an action generated by the driver agent;
a reward comprising: a signal that signifies how desirable an action performed by the driver agent is at a given time under particular environment conditions, wherein the reward is automatically computed based on road rules and driving principles extracted from human driving data or defined using other appropriate methods based on traffic and the road rules;
a goal to be achieved by the driver agent;
instance information comprising: information that indicates impact or priority of the driving experience as determined by that driver agent at the time that particular driving experience was acquired; and other meta information about that particular driving experience; and
a next state of the particular driving environment that results after the driver agent performs the action in the driving environment and a next observation made using at least part of a next observable state.

11. The system according to claim 10, wherein each of the driving environment processors is configured to process sensor information from on-board sensors that describes a specific driving environment to generate a state of the specific driving environment, and wherein each of the one or more driver agents is further configured to:
process the state, in accordance with a policy, to generate a corresponding action, wherein each policy prescribes a distribution over a plurality of actions for any given state; and
wherein the low-level controller is configured to translate each action to generate the control signals for controlling the vehicle to autonomously control the vehicle when operating in that state in that specific driving environment.

12. The system according to claim 10, wherein each of the driving policy learner modules comprises:
a Deep Reinforcement Learning (DRL) algorithm that is configured to: process input information from at least some of the driving experiences to learn and generate an output comprising: a set of parameters representing a policy that are developed through DRL, and wherein each policy is processible by at least one of the driver agents to generate an action for controlling the vehicle.

13. The system according to claim 12, wherein the output of the DRL algorithm comprises one or more of:
(1) estimated values of state/action/advantage as determined by a state/action/advantage value function; and
(2) a policy distribution.

14. The system according to claim 12, wherein each DRL algorithm comprises:
a policy-gradient-based reinforcement learning algorithm; or a value-based reinforcement learning algorithm; or an actor-critic based reinforcement learning algorithm.

15. The system according to claim 12, wherein each of the driving policy learner modules further comprises:
a learning target module configured to process trajectory steps of a driver agent within a driving environment to compute desired learning targets that are desired to be achieved, wherein each trajectory step comprises: a state, an observation, an action, a reward, a next-state and a next-observation, and wherein each learning target represents a result of an action that is desired for a given driving experience.

16. The system according to claim 15, wherein each of the learning targets comprises at least one of:
a value target that comprises: an estimated value of a state/action/advantage to be achieved; and
a policy objective to be achieved.

17. The system according to claim 15, wherein each DRL algorithm is configured to process data relating to driving experiences using stochastic gradient updates to train a neutral network comprising more than one layer of hidden units between its inputs and outputs, and wherein each of the driving policy learner modules further comprises:
a loss module, comprising:
a loss function configured to process the learning targets output by the corresponding learning target module and the output of the corresponding DRL algorithm to compute an overall output loss; and
an automatic differentiation module configured to process the overall output loss to generate gradient data for each parameter; and
a gradient descent optimizer configured to process the gradient data for each parameter to compute updated parameters representing a policy,
wherein the gradient data represents gradients of each neuron in each neural network used by each DRL algorithm, and wherein the gradients quantitatively define how much of a contribution each neuron made which resulted in the loss due to output of that neural network.

18. A system comprising:
non-transitory memory comprising instructions; and
one or more processors in communication with the memory, wherein the one or more processors execute the instructions to:
capture, via one or more driver agents and one or more corresponding one or more driving environment processors, driving experiences during different driving scenarios in different driving environments, wherein each driving experience comprises data that represents a particular driving environment at a particular time;
retrieve, via one or more driving policy learner modules of a driving policy generation module, at least some of the driving experiences;
process, at one or more driving policy learner modules, at least some of the driving experiences to learn and generate parameters that describe one or more policies, wherein each policy prescribes a distribution over a plurality of actions for any given state, and wherein each policy comprises a set of parameters that describe the policy and are processible by at least one of the driver agents to generate an action for controlling a vehicle;
process, at the one or more driver agents, received parameters for at least one candidate policy, and execute the at least one candidate policy to generate one or more actions that control the vehicle in a specific driving environment as observed by a corresponding driving environment processor; and
process, at a low-level controller, each action to generate control signals for controlling the vehicle when operating in that specific driving environment, wherein the data for each driving experience that represents a particular driving environment at a particular time, comprises:

a state of the particular driving environment observed by a corresponding driving environment processor;

an observation made using at least part of an observable state;

an action generated by the driver agent;

a reward comprising: a signal that signifies how desirable an action performed by the driver agent is at a given time under particular environment conditions, wherein the reward is automatically computed based on road rules and driving principles extracted from human driving data or defined using other appropriate methods based on traffic and the road rules;

a goal to be achieved by the driver agent;

instance information comprising: information that indicates impact or priority of the driving experience as determined by that driver agent at the time that particular driving experience was acquired; and other meta information about that particular driving experience; and a next state of the particular driving environment that results after the driver agent performs the action in the driving environment and a next observation made using at least part of a next observable state.

* * * * *